(12) United States Patent
Hunter et al.

(10) Patent No.: US 8,041,636 B1
(45) Date of Patent: Oct. 18, 2011

(54) METHOD AND APPARATUS FOR DYNAMICALLY DETERMINING INSURANCE COVERAGE

(75) Inventors: Dustin Hunter, San Diego, CA (US); Barry Nisly, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1544 days.

(21) Appl. No.: 11/404,974

(22) Filed: Apr. 14, 2006

(51) Int. Cl.
*G06Q 40/00* (2006.01)

(52) U.S. Cl. ............... 705/40; 705/1; 705/4; 705/26; 705/35; 705/36 R; 705/38; 705/39; 705/302; 709/203

(58) Field of Classification Search ............ 705/4, 36 R, 705/35–45
See application file for complete search history.

(56) References Cited

U.S. PATENT DOCUMENTS

| | | | | |
|---|---|---|---|---|
| 6,934,686 | B1 * | 8/2005 | Rajagopalan .................. | 705/1.1 |
| 7,467,183 | B2 * | 12/2008 | Arcuri et al. ................... | 709/203 |
| 7,720,750 | B2 * | 5/2010 | Brody et al. .................... | 705/38 |
| 2002/0010669 | A1 * | 1/2002 | Street .............................. | 705/36 |
| 2003/0018497 | A1 * | 1/2003 | Luedtke ........................... | 705/4 |
| 2003/0158758 | A1 * | 8/2003 | Kanazawa et al. ................ | 705/4 |
| 2004/0117216 | A1 * | 6/2004 | Dutta et al. ....................... | 705/4 |
| 2004/0215484 | A1 * | 10/2004 | McKnight et al. ................ | 705/1 |
| 2005/0038710 | A1 * | 2/2005 | Zimmerman et al. ........... | 705/26 |
| 2005/0071202 | A1 * | 3/2005 | Kendrick .......................... | 705/4 |
| 2005/0177457 | A1 * | 8/2005 | Sheltz et al. ..................... | 705/26 |
| 2005/0177507 | A1 * | 8/2005 | Bandych et al. ................. | 705/40 |
| 2005/0192833 | A1 * | 9/2005 | Artinger .......................... | 705/1 |
| 2005/0234792 | A1 * | 10/2005 | Gagnon et al. .................. | 705/36 |
| 2006/0161463 | A1 * | 7/2006 | Poonnen et al. .................. | 705/4 |
| 2006/0184379 | A1 * | 8/2006 | Tan et al. .......................... | 705/1 |
| 2006/0200396 | A1 * | 9/2006 | Satterfield et al. .............. | 705/35 |
| 2007/0136104 | A1 * | 6/2007 | Bowen et al. ..................... | 705/4 |

FOREIGN PATENT DOCUMENTS

JP  2008234449  *  3/2011

OTHER PUBLICATIONS

"AgentWare and Neat Group Team to Provide Travel Agents With Air, Car and Hotel Packages With Merchant Model Pricing." PR Newswire. PR Newswire Association LLC. 2002. HighBeam Research. May 12, 2011 <http://www.highbeam.com>.*

* cited by examiner

*Primary Examiner* — Charles R Kyle
*Assistant Examiner* — Robert R Niquette
(74) *Attorney, Agent, or Firm* — Gunnison, McKay & Hodgson, L.L.P.; Philip McKay

(57) ABSTRACT

A method and apparatus for monitoring and dynamically adjusting insurance coverage tracks new personal and/or business property purchases and alerts a concerned party, such as the insured or the insurer, to the potential need for updating insurance coverage in light of the new personal and/or business property purchases.

16 Claims, 11 Drawing Sheets

| | | |
|---|---|---|
| 241 | Sears | 500.00 251 |
| 242 | Circuit City | 500.00 252 |
| 243 | OSH | 250.00 253 |
| 244 | Monterey, California | 100.00 254 |
| 245 | Daily Total | 500.00 255 |
| 246 | Monthly Total | 2000.00 256 |
| 247 | User Defined 1 | 257 |
| 248 | User defined 2 | 258 |

FIG. 2B

ALERT!

YOUR RECENT PURCHASE
FROM CIRCUIT CITY ON 4/1/07
HAS BEEN INDENTIFIED AS
BEING POTENTIALLY ELIGIBLE
FOR INSURACNE COVERAGE
PLEASE CHECK YOUR
INSURANCE COVERAGE

PLEASE CONFIRM RECIEPT OF
THIS ALERT BY CLICKING ON
THE BOX PROVIDED BELOW

☐ CONFIRMED

DO YOU WISH TO ADD YOUR RECENT PURCHASE FROM CIRCUIT CITY ON 4/1/07 TO YOUR PROPERTY INSURANCE COVERAGE?

IF YES, PLEASE CONFIRM YOUR CHOICE BY CLICKING ON THE BOX PROVIDED BELOW

☐ ADD
561

METHOD AND APPARATUS FOR DYNAMICALLY DETERMINING INSURANCE COVERAGE

BACKGROUND OF THE INVENTION

Currently, homeowners in the United States alone spend over 49 billion dollars annually on homeowner insurance premiums. Small businesses also spend at least this amount annually protecting structures and their contents through building insurance. Most households and small businesses depend on homeowner's and building insurance to cover the cost of replacing or repairing their primary residence or place of business in the event of damage due to natural disasters such as: fire; earthquake; flooding; wind/storm; land/mudslide; and falling trees, or man-made disasters, such as: falling parts of neighboring structures; vehicles; failed or faulty service systems and appliances; etc.

Since, for most households and small businesses, the homeowner's/building insurance covers the primary residence or place of business, the long term customer focus regarding homeowner's/building insurance coverage is on the replacement/repair of the actual structure comprising the home or business building. However, in the event of a major disaster, the cost of replacing the actual home or business structure is only part of the loss incurred. Often forgotten over time is the rising replacement cost of personal/business property housed in the structure, and often lost with the structure, such as appliances, televisions and other video devices, stereo systems and other audio devices, office equipment, computing devices, and various other "durable goods" as well as furniture and collections such as art, firearms, coins, antiques, etc. Not only is the cost of replacing this personal/business property very significant, but it is these items that make any replacement, or repaired, dwelling or building a livable and functioning home or a location capable of conducting business.

Most homeowner's/building insurance policies ask for an inventory of personal/business property kept in the insured structure when the policy is written, or they provide a range, or cap, of personal/business property that is covered by the structure policy. For instance, a typical homeowner's policy will provide for replacement value of the home structure at a base premium plus, for additional premiums, various ranges of personal property value can also be covered such as: zero to five thousand dollars; five to ten thousand dollars; ten to twenty thousand dollars; and so on. In this way, the homeowner's/building insurance policies can be "customized" and made flexible enough to meet the needs of numerous different insured parties, and/or can evolve with the needs of any given insured party. However, if the total value of personal/business property housed in the insured structure changes, it is typically left to customer, i.e., the insured party, to adjust the insurance coverage and/or premium to reflect this change.

Unfortunately, as noted above, the long-term mental focus of the typical insured party regarding homeowner's/building insurance coverage is on the replacement/repair of the actual structure. Consequently, as the total value of personal/business property contained within the insured structure changes, i.e., a household grows in size or acquires/disposes of more personal property, or a business grows and takes on more employees and/or equipment, the insured party often fails to adjust the personal/business property insurance coverage to reflect, and cover, the change. Consequently, a dangerous gap often develops between insurance coverage and actual value of personal property that will need to be replaced in the event of a disaster or other emergency. This gap is often only brought to the attention of the insured party when it is too late, i.e., when disaster has struck, and they are in the worst possible position to fill the gap.

The situation described above is, obviously, not ideal for the insured parties who, after a disaster, are potentially left without sufficient coverage to either establish a new/repaired home or get back to doing business. However, the situation described above falls equally short of ideal for the insurance companies, who typically want to provide additional coverage to the insured parties as the need arises.

SUMMARY OF THE INVENTION

In accordance with one embodiment, a method and apparatus for monitoring and dynamically adjusting personal/business property insurance coverage is provided.

In one embodiment, a method and apparatus for monitoring and dynamically adjusting insurance coverage tracks new personal and/or business property purchases and alerts a concerned party, such as the insured party/user or the insurance provider, to the potential need for updating insurance coverage in light of the new personal and/or business property purchases.

In one embodiment, "trigger events" and/or "trigger parameters" are defined and data representing the trigger events and trigger parameters is stored in a computing device, or other storage device, such as a server system, a database, or a computer program product, as defined herein. In one embodiment, trigger events and/or parameters may be: any purchase from a specific store/merchant or type of store/merchant; any purchase in a specific location; a predetermined dollar amount spent at a given store or location; a predetermined dollar amount spent in a given time frame; or any other trigger event or parameter as defined by the user.

In on embodiment, once trigger events and/or trigger parameters are defined and data representing the trigger events and trigger parameters is stored, new purchases are tracked and data is collected regarding the new purchases. In one embodiment, new purchases are tracked and data is collected regarding the new purchases via a budgeting and/or accounting software program. In one embodiment, new purchases are tracked and data is collected regarding the new purchases via semi-manual means such as barcode scanning or RFID by the insured party/user or a third party. In one embodiment, new purchases are tracked and data is collected regarding the new purchases by manually entering the data in a household or business inventory system.

In one embodiment, the data collected regarding any new purchases, by whatever means, are compared to the data representing the trigger events and/or trigger parameters. If a given purchase falls within one of the trigger events and/or parameters, then, in one embodiment, that purchase is identified as a "trigger purchase", i.e., as a purchase of personal and/or business property that may be eligible for and/or require additional insurance coverage.

In one embodiment, the identification of a given purchase as a trigger purchase results in an alert being generated to bring the trigger purchase to the attention of an insured party/user. In one embodiment, the insured party/user can then decide if the purchase really is a purchase of personal and/or business property that may be eligible for and/or require additional insurance coverage and, if so, what action, if any, to take, i.e., to further identify the purchased item for detailed inventory, to immediately seek additional insurance coverage, or to take no action at all.

In one embodiment, if the given purchase is determined to be eligible for insurance coverage, the insured party/user can then opt to enter additional informational data about the purchase such as the make of item, the model of the item and the serial number, into an inventory function. In one embodiment, this additional information is then stored for a more detailed inventory listing in the event of disaster. In one embodiment, the additional information about the purchase, such as the make of item, the model of the item and the serial number, is made accessible to the insurance provider providing coverage to the insured party/user. In this embodiment, depending on the relationship between the insured party/user and the insurance provider, the insured party's/user's insurance coverage may be automatically adjusted, along with the premium, to cover the newly purchased item.

The method and apparatus for monitoring and dynamically adjusting insurance coverage described herein provides a mechanism whereby an insured party/user is alerted of the potential need to acquire additional insurance coverage at, or near, the time of purchase of the items needing such coverage. Consequently, using the method and apparatus for monitoring and dynamically adjusting insurance coverage described herein, the insured party/user is alerted to any gaps developing between the value of personal and/or business property and the insurance coverage protecting the personal and/or business property. Therefore, using the method and apparatus for monitoring and dynamically adjusting insurance coverage described herein, the insured party/user has the opportunity to make a conscious, and educated, decision as to whether or not to obtain additional insurance coverage.

In addition, in one embodiment, the insurance coverage is automatically updated to provide the additional insurance coverage necessary to protect new purchases and therefore automatically minimize, and/or eliminate, any gaps between the value of personal and/or business property and the insurance coverage protecting the personal and/or business property.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 2B shows a user interface screen whereby an insured party/user can modify, add, or delete trigger events and parameters in accordance with one embodiment;

FIG. 2C shows a display screen, in accordance with one embodiment;

FIG. 5 shows a display screen on display device including an inquiry asking the insured party/user if he/she wishes to add the new purchase of personal and/or business property to his/her insurance coverage;

Figure 1:
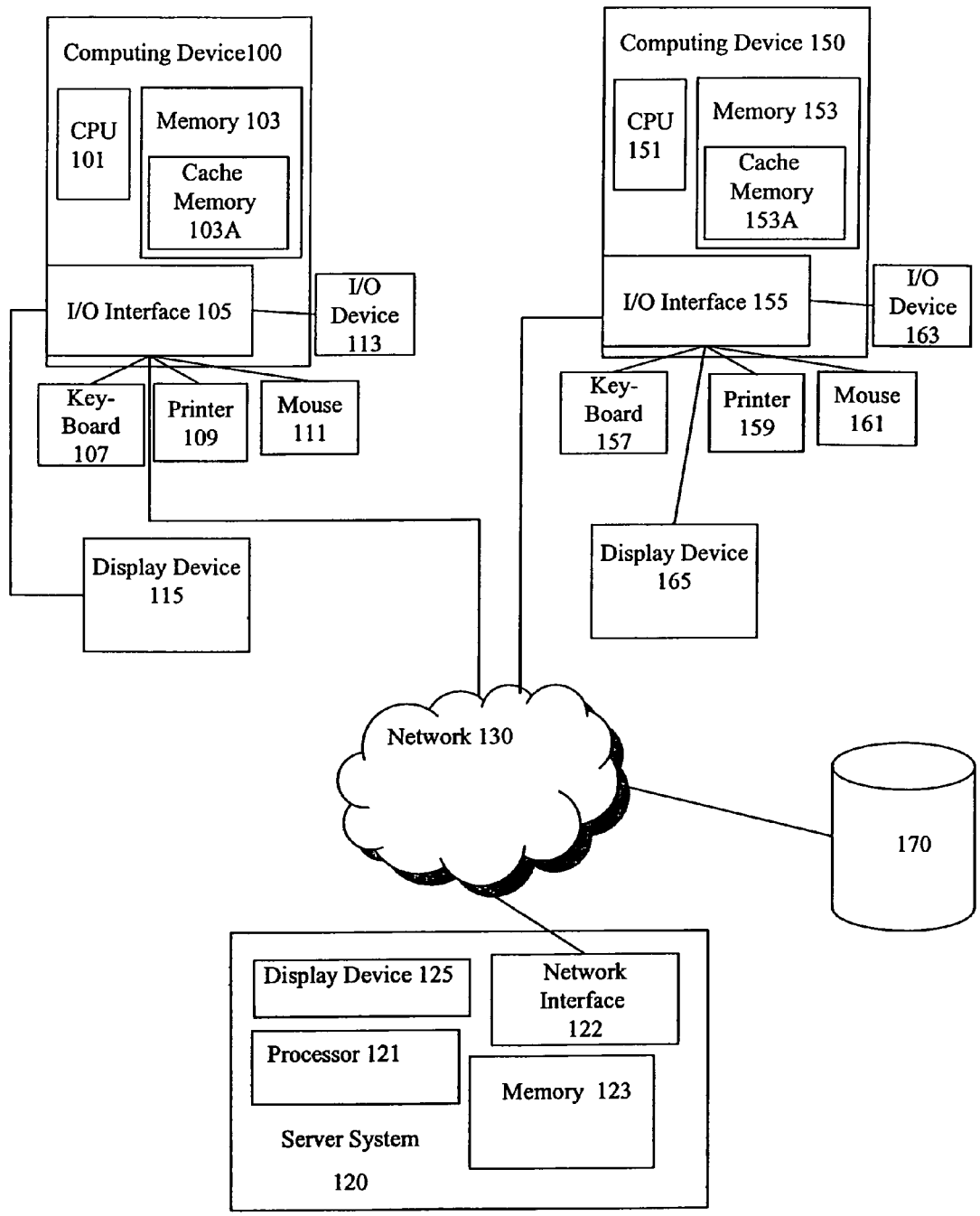
FIG. 1 is a block diagram of an exemplary hardware architecture for implementing one embodiment.

In particular, screenshots and user interface elements shown in the FIG.s are exemplary; other layouts, arrangements, formats, and user interface features may be provided without departing from the characteristics of the invention as claimed.

DETAILED DESCRIPTION

Embodiments will now be discussed with reference to the accompanying FIG.s, which depict one or more exemplary embodiments of the invention. The invention may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

For illustrative purposes, embodiments are described within the framework of homeowner's and/or business property insurance. Various specific details are discussed below, and shown in the accompanying FIG.s, to aid one of skill in the art in understanding the invention. However, such specific details are intended to be illustrative only, and are not intended to restrict in any way the scope of the present invention as claimed herein. In particular, one of skill in the art will recognize that embodiments can be used in connection with virtually any type of personal property and/or equipment inventory system. Reference herein to personal and/or business property, equipment, inventories, insurance policies, software systems, etc., should thus be taken as exemplary, and are not intended to limit the invention to a particular embodiment.

Some embodiments are implemented in a computing device including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing device. In addition, as described more fully below, embodiments can be implemented on computing devices other than a conventional computing device such as, for example, a personal digital assistant, a cell phone, or other computing device capable of processing computer readable data. Computing devices also include those in which one or more computing resources are located remotely and accessed via network, such as a Local Area Network (LAN), Wide Area Network (WAN), the Internet, or other electronic medium in which data may be exchanged between one computing device and one or more other computing device(s). Embodiments may be included as add-on software for existing software programs, packages or applications, and embodiments may be a feature of an application that is bundled with a computing device or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the method and apparatus for identifying recurring payments described herein makes use of input provided to the computing device implementing a process for monitoring and dynamically adjusting insurance coverage, such processes 200, 300, 400, 600, and 700, described herein, via user interface devices such as a keyboard, mouse, touchpad, or any other device capable of providing user input to a computing device or for translating user actions into computing device operations.

In one embodiment, described herein for illustrative purposes, a process for monitoring and dynamically adjusting insurance coverage, such processes 200, 300, 400, 600, and 700, described herein is implemented in conjunction with, interfaced with, communicatively coupled with, or as part of, a personal financial system, package, program, or application in which the system, package, program, or application tracks user payment transactions. It will be appreciated by those of skill in the art that such an embodiment is exemplary, and the present invention, far from being limited to use in or with a personal financial system, package, program, or application, can be used to enhance the capabilities of software systems, packages, programs, or applications in a multitude of domains, including business financial management systems and Tax preparation systems.

Herein, anyone interfacing with, or otherwise using, or interacting, directly or indirectly, with a parent system and/or a method or a process for monitoring and dynamically adjusting insurance coverage, such processes 200, 300, 400, 600, and 700, is also referred to as a "user".

Hardware Architecture

FIG. 1 is a block diagram of an exemplary hardware architecture for implementing one embodiment of a process for monitoring and dynamically adjusting insurance coverage, such as processes 200, 300, 400, 600, and 700, discussed below, that includes: a computing device 100, e.g., a first computing device; a computing device 150, e.g., a second computing device; a server system 120; and a database 170, all operatively connected by a network 130.

As seen in FIG. 1, computing device 100 typically includes a central processing unit (CPU) 101, hereinafter processor 101, an input output (I/O) interface 105, and a memory system 103, including cache memory 103A. Computing device 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of, inputting data to, and outputting data from, computing device 100. As discussed in more detail below, in one embodiment, a process for monitoring and dynamically adjusting insurance coverage, such as processes 200, 300, 400, 600, and 700, discussed below, can be loaded, in whole, or in part, into computing device 100 via I/O device 113, such as from a CD, DVD or floppy disk containing all, or part, of a process for monitoring and dynamically adjusting insurance coverage, such as a process for monitoring, such as processes 200, 300, 400, 600, and 700, discussed below.

Similarly, computing device 150 typically includes a central processing unit (CPU) 151, hereinafter processor 151, an input output (I/O) interface 155, and a memory system 153, including cache memory 153A. Similar to computing device 100, computing device 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing device 150. As discussed in more detail below, in one embodiment, a process for monitoring and dynamically adjusting insurance coverage, such as processes 200, 300, 400, 600, and 700, discussed below, can be loaded, in whole, or in part, into computing device 150 via I/O device 163, such as from a CD, DVD or floppy disk containing all, or part, of a process for monitoring and dynamically adjusting insurance coverage, such as processes 200, 300, 400, 600, and 700, discussed below.

Also shown in FIG. 1 is database 170. In one embodiment, database 170 is a designated server system or computing device, or a designated potion of a server system or computing device, such as computing devices 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for monitoring and dynamically adjusting insurance coverage, such as processes 200, 300, 400, 600, and 700, discussed below, is stored in whole, or in part, in database 170.

In one embodiment, computing devices 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for monitoring and dynamically adjusting insurance coverage, such as processes 200, 300, 400, 600, and 700, discussed below, is stored in whole, or in part, in server system 120.

Network 130 can be any network or network system that is of interest to a user such as a Local Area Network (LAN), a Wide Area Network (WAN), the Internet, or other network capable of allowing communication between two or more computing devices. In various embodiments, server system network interface 122 and I/O interfaces 105 and 155 include analog modems, digital modems, a network interface card, a broadband connection, or any other means for communicably coupling computing devices 100 and 150, and database 170, and server system 120 via network 130.

Those of skill in the art will readily recognize that the components shown in FIG. 1, such as computing devices 100 and 150, database 170, server system 120, and their respective components, are shown for illustrative purposes only and that architectures with more or fewer components can implement, and benefit from, the invention. Moreover, one or more components of computing device 100, computing device 150, database 170, and server system 120 may be located remotely from their respective system and accessed via network. In addition, the particular type of, and configuration of, computing devices 100 and 150, database 170, and server system 120 are not essential to the present invention.

As discussed in more detail below, in one embodiment, a process for monitoring and dynamically adjusting insurance coverage, such as processes 200, 300, 400, 600, and 700, discussed below, is stored in whole, or in part, in memory system 103 and/or cache memory 103A, of computing device 100, and/or memory system 153 and/or cache memory 153A of computing device 150, and/or in server memory system 123 of server system 120 and/or in database 170, and executed on computing device 100 and/or computing device

150. As used herein, a memory refers to a volatile memory, a non-volatile memory, or any combination of the two.

Although a process for monitoring and dynamically adjusting insurance coverage, such as processes 200, 300, 400, 600, and 700, discussed below, is sometimes referred to herein, alternatively, as an application, a program, a component of a software system, or a component of a software package, or a component of a parent system, this terminology is illustrative only. In some embodiments, a process for monitoring and dynamically adjusting insurance coverage, such as processes 200, 300, 400, 600, and 700, discussed below, is capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processors 101 and 151, or server system processor 121. In one embodiment, execution of a process for monitoring and dynamically adjusting insurance coverage, such as processes 200, 300, 400, 600, and 700, discussed below, by processor 101, processor 151, or server system processor 121, results in the operations of an agent computer process (not shown) and/or a rule computer process (not shown).

In one embodiment, a process for monitoring and dynamically adjusting insurance coverage, such as processes 200, 300, 400, 600, and 700, discussed below, is a computer application or process implemented and/or run and/or stored, in full, or in part, in, or on, a computer program product. Herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or methods capable of delivering computer readable data representing computer readable code. This medium may belong to a computing device, such as computing devices 100 and 150 of FIG. 1, described above. However, the medium also may be removed from the computing device.

For example, all, or part, of a process for monitoring and dynamically adjusting insurance coverage, such as processes 200, 300, 400, 600, and 700, discussed below, may be stored in a memory that is physically located in a location, such as server system memory 123, or database 170, of FIG. 1, different from a computing device, such as computing devices 100 and/or 150 of FIG. 1, utilizing a process for monitoring and dynamically adjusting insurance coverage, such as processes 200, 300, 400, 600, and 700, discussed below. In one embodiment, all, or part, of a process for monitoring and dynamically adjusting insurance coverage, such as processes 200, 300, 400, 600, and 700, discussed below, may be stored in a memory that is physically located, separate from the computing device's processor(s), such as processors 101 and 151 of FIG. 1, and the computing device processor(s) can be coupled to the memory in a client-server system, such as server system 120 of FIG. 1, or, alternatively, via connection to another computer, such as computing devices 100, 150 of FIG. 1, via modems and analog lines, digital interfaces and a digital carrier line, or wireless or cellular connections.

In one embodiment, the computing devices and/or server system running and/or utilizing and/or storing all, or part, of a process for monitoring and dynamically adjusting insurance coverage, such as processes 200, 300, 400, 600, and 700, discussed below, such as computing devices 100 and/or 150 and/or server system 120 of FIG. 1, is a portable computer, a workstation, a two-way pager, a cellular telephone, a smart phone, a digital wireless telephone, a personal digital assistant, a server computer, an Internet appliance, or any other device that includes components that can execute all, or part, of a process for monitoring and dynamically adjusting insurance coverage, such as processes 200, 300, 400, 600, and 700, discussed below, in accordance with at least one of the embodiments as described herein. Similarly, in another embodiment, a process for monitoring and dynamically adjusting insurance coverage, such as processes 200, 300, 400, 600, and 700, discussed below, is implemented on and/or run and/or stored on a computing device and/or server system that is comprised of multiple different computers, wireless devices, cellular telephones, digital telephones, two-way pagers, personal digital assistants, server computers, or any desired combination of these devices, that are interconnected to perform the methods as described herein.

Figure 2A:
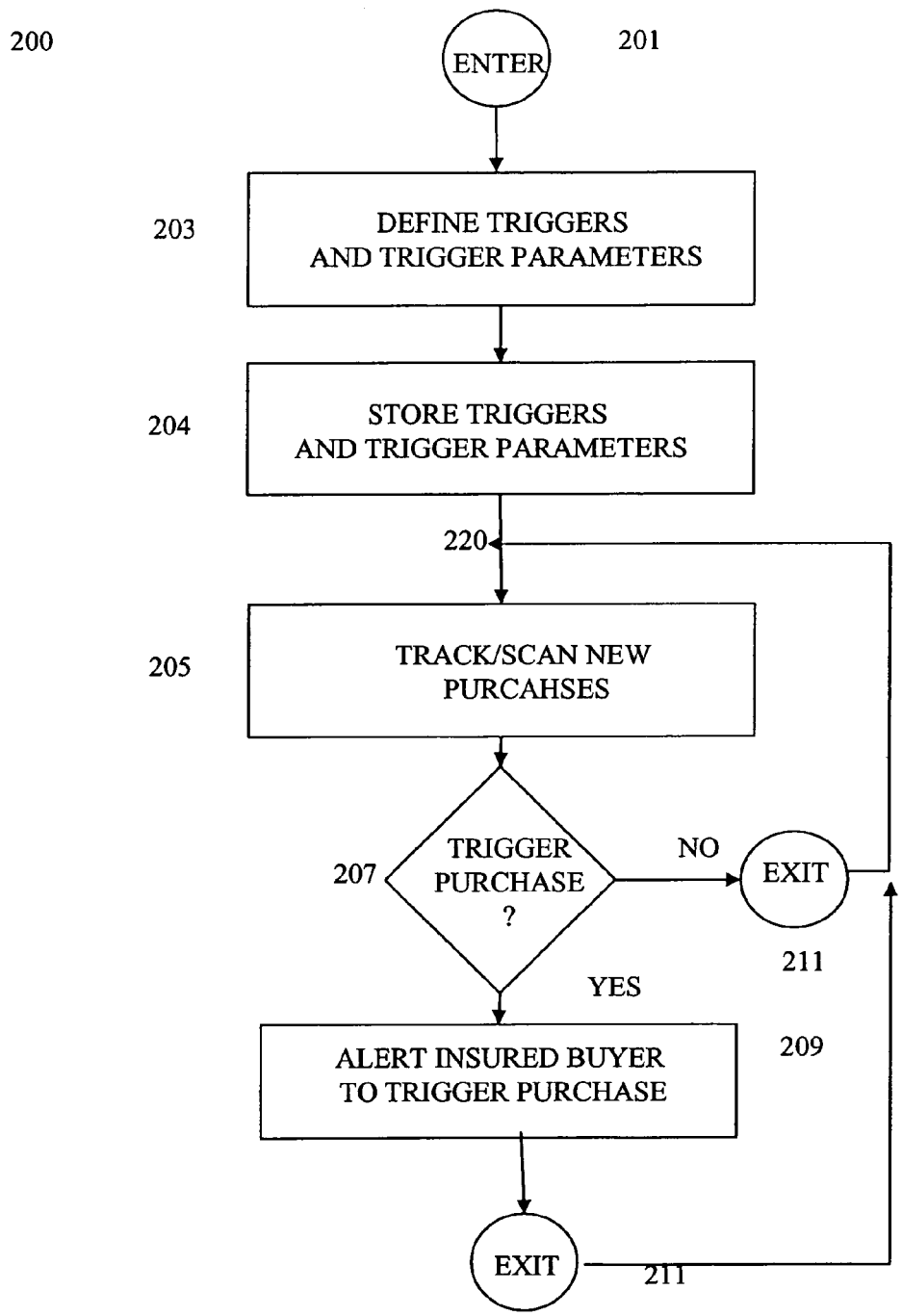
FIG. 2A is a flow diagram of a process for monitoring and dynamically adjusting insurance coverage in accordance with one embodiment.

Referring to FIGS. 2A and 2B together, a flow diagram of a process for monitoring and dynamically adjusting insurance coverage 200 in accordance with one embodiment is shown. Process for monitoring and dynamically adjusting insurance coverage 200 begins at enter operation 201. From enter operation 201, process flow moves to DEFINE TRIGGERS AND TRIGGER PARAMETERS OPERATION 203.

At DEFINE TRIGGERS AND TRIGGER PARAMETERS OPERATION 203 "trigger events" and/or "trigger parameters" are defined. In one embodiment, trigger events and/or parameters may be: any purchase from a specific store/merchant, or type of store/merchant; any purchase in a specific location; a predetermined dollar amount spent at a given store or location; a predetermined dollar amount spent in a given time frame; or any other event or parameter as defined by the user.

For example, in one embodiment, activity from specific stores/merchants such as furniture stores, appliance stores, electronics stores, department stores, membership stores, hardware stores, business equipment stores, office equipment stores, office supply stores, and any other stores/merchants designated either by the provider of process for monitoring and dynamically adjusting insurance coverage 200, or by the user, are defined as trigger events. In addition, in one embodiment, specific Internet based stores/merchants and/or transactions are trigger events. As further example, in one embodiment, predetermined dollar amounts spent at any of the specific stores/merchants discussed above is defined as a trigger parameter associated with the trigger event.

As another example, in one embodiment, any purchase activity conducted in a designated physical location, such as a specified town, city, state, or country, is defined as a trigger event. As further example, predetermined dollar amounts spent at any of the designated locations can be defined as a trigger parameter associated with the trigger event.

As another example, in one embodiment, any single purchase, wherever made, exceeding a predetermined dollar amount is defined as a trigger event. As a further example, in one embodiment, any combination of purchases exceeding a predetermined dollar amount over the course of a predetermined time frame can be defined is a trigger parameter.

As another example, in one embodiment, specific product categories and or products such as appliances, electronics, audio and video equipment, computers, furniture, office equipment, office furniture, etc. are specifically identified and defined as trigger events.

As noted above, in one embodiment, trigger events and parameters are predefined and/or preprogrammed and/or packaged by and the provider of process for monitoring and dynamically adjusting insurance coverage 200. In one embodiment, the predefined trigger events and parameters are supplemented by providing user defined trigger event and parameter capabilities and allowing user modification of the predefined trigger events and parameters via a user interface device such as keyboards 107, 157 and mice 111, 161 of FIG. 1.

In one embodiment, the trigger events and parameters are manually entered, or are obtained from another location such as a server system, such as server system 120 of FIG. 1, or from a database, such as database 170 of FIG. 1, or from a computer readable medium, and/or any computer program product, as defined herein, and then provided to process for monitoring and dynamically adjusting insurance coverage 200 at DEFINE TRIGGERS AND TRIGGER PARAMETERS OPERATION 203.

As a specific example of a trigger event and a trigger parameter, in one embodiment, we stipulate that any purchase from a specific electronics store, such as Circuit City, is predefined by the provider of process for monitoring and dynamically adjusting insurance coverage 200 as a trigger event, while any purchase at Circuit City of more than $100.00 is predefined as a trigger parameter by the provider of process for monitoring and dynamically adjusting insurance coverage 200. Further, in one example, it may be the case that a specific insured party/user often makes purchases of items at Circuit City totaling $100.00 or more that are not eligible for insurance coverage, such as phone cards or computer software. Consequently, this particular insured party/user may edit/customize process for monitoring and dynamically adjusting insurance coverage 200 at DEFINE TRIGGERS AND TRIGGER PARAMETERS OPERATION 203, in one embodiment via a user interface device such as keyboards 107, 157 and mice 111, 161 of FIG. 1, by either dropping Circuit City purchases as a trigger event or raising the dollar amount of the trigger parameter to a larger amount, such as $500.00.

FIG. 2B shows one embodiment of a display screen 220 on a display device 215, such as display devices 115 and 165 of FIG. 1, including a trigger events and trigger parameters user interface screen 230 whereby an insured party/user can modify, add or delete trigger events and parameters. As seen in FIG. 2B, in one embodiment, trigger events and trigger parameters user interface screen 230 includes trigger events 241 to 248 and associated trigger parameters 251 to 258. As seen in FIG. 2B, in one embodiment, trigger events 241 to 248 include specific stores/merchant trigger events for Sears 241, Circuit City 242, Orchard Supply Hardware (OSH) 243 and associated trigger parameters of 251 of $500.00 for Sears 241, 252 of $500.00 for Circuit City 242, and 253 of $250.00 for OSH 243. Also shown in trigger events and trigger parameters user interface screen 230 of FIG. 2B is a designated physical location trigger event 244 for purchases made in Monterey Calif. with an associated trigger parameter 254 of $100.00. Also shown in trigger events and trigger parameters user interface screen 230 are predetermined dollar amount per time period trigger events 245 and 246 with daily and monthly time frames, respectively, and trigger parameters of $500.00 and $2000.00, respectively. Also shown in trigger events and trigger parameters user interface screen 230 are user defined trigger events 247 and 248 with associated trigger parameters 257 and 258, respectively.

As discussed above, in one embodiment, trigger events 241 to 246 and trigger parameters 251 to 256 are predefined and/or preprogrammed and/or packaged by the provider of process for monitoring and dynamically adjusting insurance coverage 200. In one embodiment, predefined trigger events 241 to 246 and parameters 251 to 256 are supplemented by providing user defined trigger events 247 and 248 and trigger parameters 257 and 258 and allowing user modification of the predefined trigger events 241 to 246 and parameters 251 to 256 via a user interface device such as keyboards 107, 157 and mice 111, 161 of FIG. 1.

Once trigger events and/or trigger parameters are defined at DEFINE TRIGGERS AND TRIGGER PARAMETERS OPERATION 203, process flow moves to STORE TRIGGERS AND TRIGGER PARAMETERS OPERATION 204. At STORE TRIGGERS AND TRIGGER PARAMETERS OPERATION 204, the trigger events and parameters defined at DEFINE TRIGGERS AND TRIGGER PARAMETERS OPERATION 203 are stored in any one or more of numerous locations, by any one of the numerous mechanisms known to those of skill in the art. For instance, in one embodiment, at STORE TRIGGERS AND TRIGGER PARAMETERS OPERATION 204, data about the trigger events and parameters defined at DEFINE TRIGGERS AND TRIGGER PARAMETERS OPERATION 203 is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, at STORE TRIGGERS AND TRIGGER PARAMETERS OPERATION 204, data about the trigger events and parameters defined at DEFINE TRIGGERS AND TRIGGER PARAMETERS OPERATION 203 is stored in any computing device and/or server system, such as computing devices 100, 151, or server system 120, or other device, in another location, or on/in computer readable medium, and/or any other computer program product, as defined herein. In one embodiment, at STORE TRIGGERS AND TRIGGER PARAMETERS OPERATION 204 data about the trigger events and parameters defined at DEFINE TRIGGERS AND TRIGGER PARAMETERS OPERATION 203 is stored on a webpage or in a web-based system.

Once the trigger events and parameters defined at DEFINE TRIGGERS AND TRIGGER PARAMETERS OPERATION 203 are stored as data at STORE TRIGGERS AND TRIGGER PARAMETERS OPERATION 204, process flow moves to TRACK/SCAN NEW PURCHASES OPERATION 205. At TRACK/SCAN NEW PURCHASES OPERATION 205, a new purchase is entered into the computing device using process for monitoring and dynamically adjusting insurance coverage 200. In one embodiment, data regarding new purchases is obtained/tracked via an interface with a money management software program such as Quicken®, a product of Intuit Inc. of Mountain View Calif., or similar products, and/or tax preparation software such as TurboTax®, a product of Intuit Inc. of Mountain View Calif., or similar products, which include a capability for tracking, gathering, storing, and categorizing data regarding purchases such as: purchase amounts; merchants/stores where the purchase was made; locations where the purchase was made; and the purchase dates. In addition, many money management software programs such as Quicken® often automatically categorize purchases by predefined parameters and/or customer defined parameters.

In another embodiment, data regarding new purchases is manually entered by the insured party/user via a user interface device such as keyboards 107, 157 and mice 111, 161 of FIG. 1.

In another embodiment, data regarding new purchases is entered semi-automatically using devices such as a barcode reader, an RFID device and reader, or any other semi-automated inventory system to identify a purchase of specific products or a purchase from specific product category. Using these devices, data regarding new purchases can be scanned directly into a computing device, such as computing devices 100, 151 described above, and/or server system, such as server system 120 of FIG. 1, or other device, or to another location such as a centralized server or database, such as database 170 of FIG. 1, or onto or into a computer readable medium, and/or any computer program product, as defined herein, at TRACK/SCAN NEW PURCHASES OPERATION 205.

Once the data regarding a new purchase is obtained at TRACK/SCAN NEW PURCHASES OPERATION 205, process flow moves to TRIGGER PURCHASE? OPERATION 207. At TRIGGER PURCHASE? OPERATION 207 the data regarding the new purchase obtained at TRACK/SCAN NEW PURCHASES OPERATION 205 is compared with the trigger event and trigger parameters data defined at DEFINE TRIGGERS AND TRIGGER PARAMETERS OPERATION 203, and stored at STORE TRIGGERS AND TRIGGER PARAMETERS OPERATION 204, to determine if there is a match. In one embodiment, this comparison is accomplished via a look-up table or other register/storage based means for comparing data.

If none of the new purchase data obtained at TRACK/SCAN NEW PURCHASES OPERATION 205 matches any of the trigger events and trigger parameters data defined at DEFINE TRIGGERS AND TRIGGER PARAMETERS OPERATION 203, and stored at STORE TRIGGERS AND TRIGGER PARAMETERS OPERATION 203, i.e., a NO result is obtained at TRIGGER PURCHASE? OPERATION 207, then, in one embodiment, process for monitoring and dynamically adjusting insurance coverage 200 is exited at EXIT 211 and, in one embodiment, process flow returns to point 220 to await the next new purchase.

On the other hand, if any of the new purchase data obtained at TRACK/SCAN NEW PURCHASES OPERATION 205 matches any of the trigger event and trigger parameters data defined at DEFINE TRIGGERS AND TRIGGER PARAMETERS OPERATION 203, and stored at STORE TRIGGERS AND TRIGGER PARAMETERS OPERATION 203, i.e., a YES result is obtained at TRIGGER PURCHASE? OPERATION 207, then, in one embodiment, the new purchase is identified as a "trigger purchase", i.e., as a purchase of personal and/or business property that may be eligible for and/or require additional insurance coverage and process flow moves to ALERT INSURED BUYER TO TRIGGER PURCHASE OPERATION 209.

At ALERT INSURED BUYER TO TRIGGER PURCHASE OPERATION 209, an alert is sent to the insured party/user informing him/her that the new purchase of personal and/or business property may be eligible for and/or require additional insurance coverage.

In one embodiment, the alert generated at ALERT INSURED BUYER TO TRIGGER PURCHASE OPERATION 209 is in the form of a pop-up display shown on a display device such as display devices 115, 165, 125 of FIG. 1. FIG. 2C shows display screen 220 on display device 215, such as display devices 115 and 165 of FIG. 1, including an alert screen 260 activated at ALERT INSURED BUYER TO TRIGGER PURCHASE OPERATION 209 notifying the insured party/user that the new purchase of personal and/or business property from TRACK/SCAN NEW PURCHASES OPERATION 205 may be eligible for and/or require additional insurance coverage.

In one embodiment, alert screen 260 generated at ALERT INSURED BUYER TO TRIGGER PURCHASE OPERATION 209 requires a positive action/acknowledgement such as check box 261 from the insured party/user before alert screen 260 can be closed or otherwise terminated.

In one embodiment, the alert generated at ALERT INSURED BUYER TO TRIGGER PURCHASE OPERATION 209 is in the form of an E-mail or a computer telephony message or even an automatically generated phone call or letter. In one embodiment, the alert generated at ALERT INSURED BUYER TO TRIGGER PURCHASE OPERATION 209 is sent to a portable computer, a workstation, a two-way pager, a cellular telephone, a smart phone, a digital wireless telephone, a personal digital assistant, a server computer, an Internet appliance, or any other device capable of displaying a video and/or audio alert to the insured party/user.

In one embodiment, other alerts similar to the alert generated at ALERT INSURED BUYER TO TRIGGER PURCHASE OPERATION 209 are generated. In one embodiment, alerts can be generated to remind the insured party/user to obtain/update appraisals on selected purchases such as jewelry, art and firearms. The appraisal reminders can be defined by the insured party/user and/or selected on an item-by item/purchase-by-purchase basis at TRACK/SCAN NEW PURCHASES OPERATION 205.

In one embodiment, once the insured party/user is alerted at ALERT INSURED BUYER TO TRIGGER PURCHASE OPERATION 209, process for monitoring and dynamically adjusting insurance coverage 200 is exited at EXIT 211 and, in one embodiment, process flow returns to point 220 to await the next purchase.

Returning to the specific example discussed above where a purchase from Circuit City is a trigger event and a customized $500.00 or more limit is the associated trigger parameter, suppose two separate purchases were made at Circuit City. The first for $189.00 and the second for $676.00. Using process for monitoring and dynamically adjusting insurance coverage 200, the purchases would be treated as follows.

As discussed above, in this example Circuit City, was predefined by the provider of process for monitoring and dynamically adjusting insurance coverage 200 as a trigger event, while any purchase at Circuit City of more than $100.00 was predefined as a trigger parameter by the provider of process for monitoring and dynamically adjusting insurance coverage 200 at DEFINE TRIGGERS AND TRIGGER PARAMETERS OPERATION 203 and this data was stored at STORE TRIGGERS AND TRIGGER PARAMETERS OPERATION 204. However, in this example the insured party/user raised the dollar amount of the trigger parameter to $500.00, using a user interface device such as keyboards 107, 157 and mice 111, 161 of FIG. 1, at DEFINE TRIGGERS AND TRIGGER PARAMETERS OPERATION 203 and this modified data was stored at STORE TRIGGERS AND TRIGGER PARAMETERS OPERATION 204.

In this example we will assume the insured party/user employs a money management software program such as Quicken®. Therefore, data such as the purchase location, "Circuit City" and the purchase amount, $189.00 and $676.00, regarding the first and second "new" purchases, respectively is obtained/tracked via an interface with the money management software program at TRACK/SCAN NEW PURCHASES OPERATION 205.

In this example, at TRIGGER PURCHASE? OPERATION 207 the data regarding the first purchase obtained at TRACK/SCAN NEW PURCHASES OPERATION 205, i.e., a Circuit City purchase of $189.00 is compared with the trigger event and trigger parameters data defined at DEFINE TRIGGERS AND TRIGGER PARAMETERS OPERATION 203, and stored at STORE TRIGGERS AND TRIGGER PARAMETERS OPERATION 204, to determine if there is a match. In this instance, while there is a match with respect to the base trigger event, i.e., the purchase was made at Circuit City, there is no match with respect to the associated trigger parameter, i.e., the purchase price of $189.00 does not exceed the adjusted $500.00 trigger parameter. Therefore, in this example, the result at TRIGGER PURCHASE? OPERATION 207 is NO and process for monitoring and dynamically adjusting insurance coverage 200 is exited at EXIT 211 and process flow returns to point 220 to await the second purchase data.

At 220 the second purchase is tracked and the data regarding the second purchase obtained at TRACK/SCAN NEW PURCHASES OPERATION 205, i.e., a Circuit City purchase of $676.00, is compared with the trigger event and trigger parameters data defined at DEFINE TRIGGERS AND TRIGGER PARAMETERS OPERATION 203, and stored at STORE TRIGGERS AND TRIGGER PARAMETERS OPERATION 204, to determine if there is a match. In this example there is a match with respect to the base trigger event, i.e., the purchase was made at Circuit City, and with respect to the associated trigger parameter, i.e., the purchase price of $676.00 does exceed the $500.00 trigger parameter. Therefore, in this example, the result at TRIGGER PURCHASE? OPERATION 207 is YES and the second purchase is identified as a "trigger purchase", i.e., as a purchase of personal and/or business property that may be eligible for and/or require additional insurance coverage. Consequently, an alert is generated at ALERT INSURED BUYER TO TRIGGER PURCHASE OPERATION 209.

In one embodiment, assuming an appropriate agreement exists between the insured party/user and his/her insurance provider, the information about a new purchase is sent directly to the insurance provider and, in one embodiment, the insurance coverage is automatically adjusted to reflect/cover the new purchase.

Figure 3:
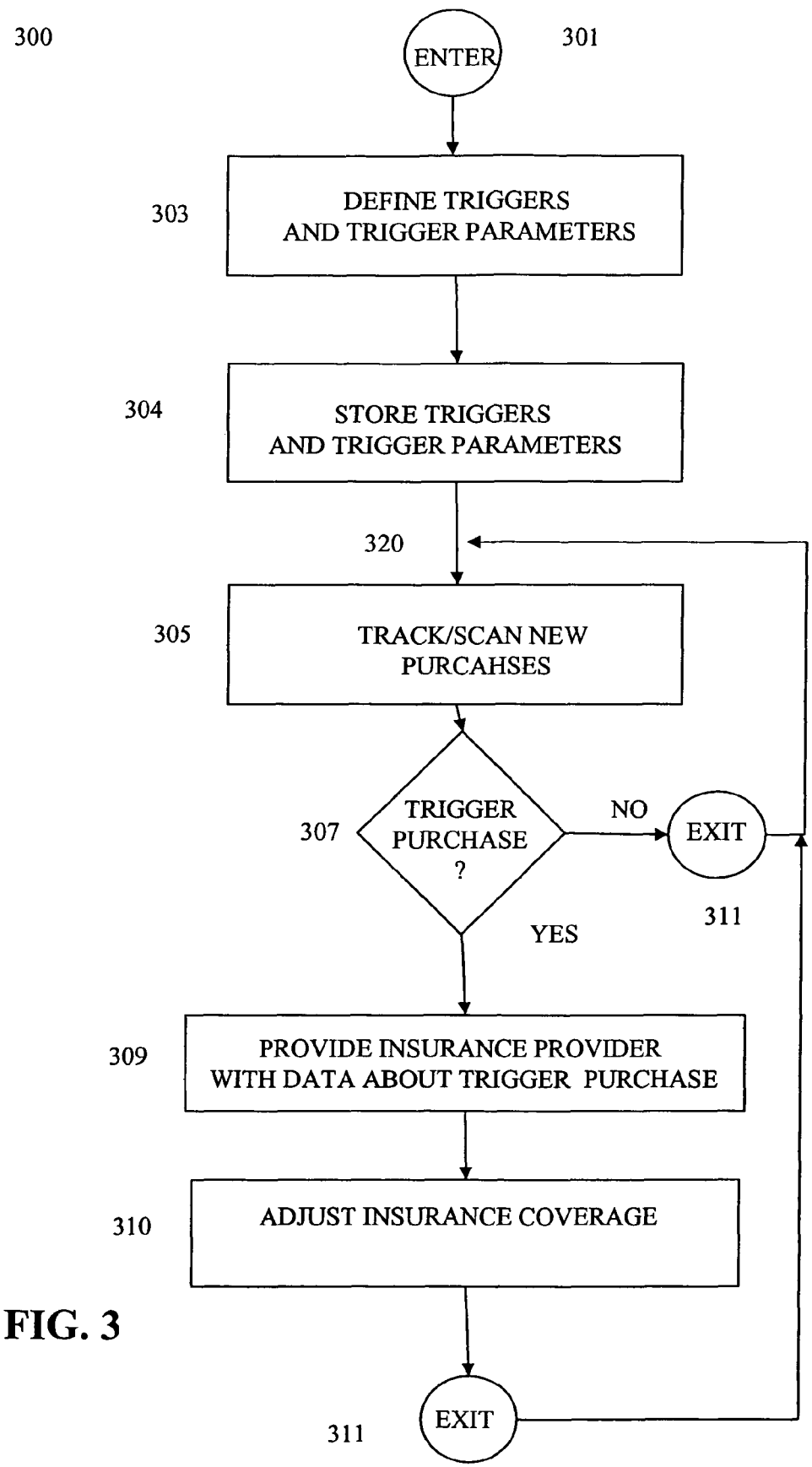
FIG. 3 is a flow diagram of a process for monitoring and dynamically adjusting insurance coverage in accordance with one embodiment.

Referring to FIG. 3, a flow diagram of a process for monitoring and dynamically adjusting insurance coverage 300 in accordance with one embodiment is shown. Process for monitoring and dynamically adjusting insurance coverage 300 begins at enter operation 301. From enter operation 301, process flow moves to DEFINE TRIGGERS AND TRIGGER PARAMETERS OPERATION 303.

DEFINE TRIGGERS AND TRIGGER PARAMETERS OPERATION 303 of process for monitoring and dynamically adjusting insurance coverage 300 is substantially similar to DEFINE TRIGGERS AND TRIGGER PARAMETERS OPERATION 203 of process for monitoring and dynamically adjusting insurance coverage 200, discussed above, and the entire discussion above regarding DEFINE TRIGGERS AND TRIGGER PARAMETERS OPERATION 203 of process for monitoring and dynamically adjusting insurance coverage 200 applies to, and is incorporated here for, DEFINE TRIGGERS AND TRIGGER PARAMETERS OPERATION 303 of process for monitoring and dynamically adjusting insurance coverage 300. In particular, in one embodiment of process for monitoring and dynamically adjusting insurance coverage 300, trigger events and/or parameters may be: any purchase from a specific store/merchant, or type of store/merchant; any purchase in a specific location; a predetermined dollar amount spent at a given store or location; a predetermined dollar amount spent in a given time frame; or any other trigger event or parameter as defined by the user.

As noted above, in one embodiment, trigger events and parameters can be predefined, preprogrammed and packaged by the provider of process for monitoring and dynamically adjusting insurance coverage 300. In one embodiment, the predefined trigger events and parameters are supplemented by providing user defined trigger event and parameter capabilities and allowing user modification of the predefined trigger events and parameters via a user interface device such as keyboards 107, 157 and mice 111, 161 of FIG. 1.

In one embodiment, the trigger events and parameters are manually entered or are obtained from another location such as a server system, such as server system 130 of FIG. 1, or from a database, such as database 170 of FIG. 1, or from a computer readable medium, and/or any computer program product, as defined herein, and then provided to process for monitoring and dynamically adjusting insurance coverage 300 at DEFINE TRIGGERS AND TRIGGER PARAMETERS OPERATION 303.

Once trigger events and/or trigger parameters are defined at DEFINE TRIGGERS AND TRIGGER PARAMETERS OPERATION 303, process flow moves to STORE TRIGGERS AND TRIGGER PARAMETERS OPERATION 304.

STORE TRIGGERS AND TRIGGER PARAMETERS OPERATION 304 of process for monitoring and dynamically adjusting insurance coverage 300 is substantially similar to STORE TRIGGERS AND TRIGGER PARAMETERS OPERATION 204 of process for monitoring and dynamically adjusting insurance coverage 200 discussed above, and the entire discussion above regarding STORE TRIGGERS AND TRIGGER PARAMETERS OPERATION 204 of process for monitoring and dynamically adjusting insurance coverage 200 applies to, and is incorporated here for, STORE TRIGGERS AND TRIGGER PARAMETERS OPERATION 304 of process for monitoring and dynamically adjusting insurance coverage 300. In particular, in one embodiment of process for monitoring and dynamically adjusting insurance coverage 300, at STORE TRIGGERS AND TRIGGER PARAMETERS OPERATION 304, the trigger events and parameters defined at DEFINE TRIGGERS AND TRIGGER PARAMETERS OPERATION 303 are stored in any one or more of numerous locations, by any one of the numerous mechanisms known to those of skill in the art and as described above with respect to STORE TRIGGERS AND TRIGGER PARAMETERS OPERATION 204 of process for monitoring and dynamically adjusting insurance coverage 200.

Once the trigger events and parameters defined at DEFINE TRIGGERS AND TRIGGER PARAMETERS OPERATION 303 are stored at STORE TRIGGERS AND TRIGGER PARAMETERS OPERATION 304, process flow moves to TRACK/SCAN NEW PURCHASES OPERATION 305.

TRACK/SCAN NEW PURCHASES OPERATION 305 of process for monitoring and dynamically adjusting insurance coverage 300 is substantially similar to TRACK/SCAN NEW PURCHASES OPERATION 205 of process for monitoring and dynamically adjusting insurance coverage 200 discussed above, and the entire discussion above regarding TRACK/SCAN NEW PURCHASES OPERATION 205 of process for monitoring and dynamically adjusting insurance coverage 200 applies to, and is incorporated here for, TRACK/SCAN NEW PURCHASES OPERATION 305 of process for monitoring and dynamically adjusting insurance coverage 300. In particular, in one embodiment of process for monitoring and dynamically adjusting insurance coverage 300, at TRACK/SCAN NEW PURCHASES OPERATION 305, data regarding a new purchase is entered into the computing device using process for monitoring and dynamically adjusting insurance coverage 300 via any of the means for obtaining/tracking data regarding a new purchase discussed above with respect to TRACK/SCAN NEW PURCHASES OPERATION 205 of process for monitoring and dynamically adjusting insurance coverage 200.

Once the data regarding a new purchase is obtained at TRACK/SCAN NEW PURCHASES OPERATION 305, process flow moves to TRIGGER PURCHASE? OPERATION 307. At TRIGGER PURCHASE? OPERATION 307 where the data regarding the new purchase obtained at TRACK/SCAN NEW PURCHASES OPERATION 305 is compared with the trigger event and trigger parameters data defined at DEFINE TRIGGERS AND TRIGGER PARAMETERS OPERATION 303, and stored at STORE TRIGGERS AND TRIGGER PARAMETERS OPERATION 304, to determine if there is a match. In one embodiment, this comparison is accomplished via a look-up table or other register/storage based means for comparing data.

If none of the new purchase data obtained at TRACK/SCAN NEW PURCHASES OPERATION 305 matches any of the trigger event and trigger parameters data defined at DEFINE TRIGGERS AND TRIGGER PARAMETERS OPERATION 303, and stored at STORE TRIGGERS AND TRIGGER PARAMETERS OPERATION 303, i.e., a NO result is obtained at TRIGGER PURCHASE? OPERATION 307, then, in one embodiment, process for monitoring and dynamically adjusting insurance coverage 300 is exited at EXIT 311 and, in one embodiment, process flow returns to point 320 to await the next purchase.

On the other hand, if any of the new purchase data obtained at TRACK/SCAN NEW PURCHASES OPERATION 305 matches any of the trigger event and trigger parameters data defined at DEFINE TRIGGERS AND TRIGGER PARAMETERS OPERATION 303, and stored at STORE TRIGGERS AND TRIGGER PARAMETERS OPERATION 303, i.e., a YES result is obtained at TRIGGER PURCHASE? OPERATION 307, then, in one embodiment, the new purchase is identified as a "trigger purchase", i.e., as a purchase of personal and/or business property that may be eligible for and/or require additional insurance coverage and process flow moves to PROVIDE INSURANCE PROVIDER WITH DATA ABOUT TRIGGER PURCHASE OPERATION 309.

At PROVIDE INSURANCE PROVIDER WITH DATA ABOUT TRIGGER PURCHASE OPERATION 309, data regarding the trigger purchase from TRACK/SCAN NEW PURCHASES OPERATION 305 is made available to the insurance provider providing the insured party/user's coverage.

In one embodiment data regarding the trigger purchase from TRACK/SCAN NEW PURCHASES OPERATION 305 is made available to the insurance provider via direct transmission of the information via network connection, E-mail, phone messaging, a connection to another computer via modems and analog lines, digital interfaces and a digital carrier line, or wireless or cellular connections to a portable computer, a workstation, a two-way pager, a cellular telephone, a smart phone, a digital wireless telephone, a personal digital assistant, a server computer, an Internet appliance, or any other device capable of displaying a video and/or audio.

In one embodiment, data regarding the trigger purchase from TRACK/SCAN NEW PURCHASES OPERATION 305 is made available to the insurance provider at PROVIDE INSURANCE PROVIDER WITH DATA ABOUT TRIGGER PURCHASE OPERATION 309 by placing the information in a memory, such as memory systems 103, 153 of FIG. 1, of a computing device, such as computing devices 100, 150 of FIG. 1, or in a server memory system, such as server memory system 123, of a local, or remotely, based sever system, such as server system 120 of FIG. 1, and then granting the insurance provider access to the computing device and/or server system.

Returning to FIG. 3, in one embodiment, data regarding the trigger purchase from TRACK/SCAN NEW PURCHASES OPERATION 305 is made available to the insurance provider at PROVIDE INSURANCE PROVIDER WITH DATA ABOUT TRIGGER PURCHASE OPERATION 309 by placing the information in a database, such as database 170 of FIG. 1, and then granting the insurance provider access to the database.

Returning to FIG. 3, in one embodiment, data regarding the trigger purchase from TRACK/SCAN NEW PURCHASES OPERATION 305 is made available to the insurance provider at PROVIDE INSURANCE PROVIDER WITH DATA ABOUT TRIGGER PURCHASE OPERATION 309 by placing the information on a webpage and/or in a web-based system and then granting the insurance provider access to the webpage and/or web-based system.

In one embodiment, the computing devices and/or the server system and/or data base and/or the web-based system discussed above, where the data regarding the trigger purchase from TRACK/SCAN NEW PURCHASES OPERATION 305 resides, may be maintained by the insured party/user and/or the insurance provider and/or a third party, such as the provider of a process for monitoring and dynamically adjusting insurance coverage, such as processes for monitoring and dynamically adjusting insurance coverage 200, 300, 400, 600, and 700.

In one embodiment, the computing devices and/or the server system and/or data base and/or the web-based system discussed above, where the data regarding the trigger purchase from TRACK/SCAN NEW PURCHASES OPERATION 305 resides can be made accessible by more than one insurance provider, at the insured party/user's request. In this embodiment, multiple insurance provides could access the data regarding the trigger purchase from TRACK/SCAN NEW PURCHASES OPERATION 305 and provide competitive bids for coverage, thereby giving the insured party/user the opportunity to dynamically shop for insurance at home based on actual property data.

In one embodiment, data regarding the trigger purchase from TRACK/SCAN NEW PURCHASES OPERATION 305 is made available to the insurance provider at PROVIDE INSURANCE PROVIDER WITH DATA ABOUT TRIGGER PURCHASE OPERATION 309 by placing the information in/on a computer readable medium and/or other computer program product, as defined herein, and then providing the computer medium or program product to the insurance provider.

In one embodiment, the data regarding the trigger purchase from TRACK/SCAN NEW PURCHASES OPERATION 305 is supplemented at PROVIDE INSURANCE PROVIDER WITH DATA ABOUT TRIGGER PURCHASE OPERATION 309 to include make and model numbers, serial numbers and other identifying data, by the insured party/user via a user interface device, such as keyboards 107, 157 and/or mice 111, 161, or by a bar code system, an RFID system, or some other semi-automated system for obtaining product identification data. In this way, the insurance provider is provided with the details necessary to calculate value/replacement cost and the insured party/user can store a more detailed inventory for any future claim. In one embodiment, images and/or photographs of the purchased item can be included at PROVIDE INSURANCE PROVIDER WITH DATA ABOUT TRIGGER PURCHASE OPERATION 309.

In one embodiment, the data regarding the trigger purchase from TRACK/SCAN NEW PURCHASES OPERATION 305 is automatically backed up at regular intervals to a memory, such as memory systems 103, 153 of FIG. 1, of a computing device, such as computing devices 100, 150 of FIG. 1, or in a server memory system, such as server memory system 123, of a local, or remotely, based sever system of database, such as server system 120 or database 170 of FIG. 1, or to a web-based system, for safekeeping of the data regarding the trigger purchase from TRACK/SCAN NEW PURCHASES OPERATION 305 (FIG. 3) in a secure second location in case the original data is part of the personal/business property destroyed in a disaster.

In one embodiment, the data regarding the trigger purchase from TRACK/SCAN NEW PURCHASES OPERATION 305 is used to generate lists or reports for insurance claims and/or inventory or for tax/business purposes.

Once the data regarding the trigger purchase from TRACK/SCAN NEW PURCHASES OPERATION 305 is provided to the insurance provider at PROVIDE INSURANCE PROVIDER WITH DATA ABOUT TRIGGER PURCHASE OPERATION 309, process flow moves to ADJUST INSURANCE COVERAGE OPERATION 310. At ADJUST INSURANCE COVERAGE OPERATION 310, the insured party/user's insurance coverage is adjusted to include the full value and/or replacement value and/or depreciated value of the trigger purchase. In one embodiment, assuming an appropriate agreement is in place between the insured party/user and insurance provider, the insured party/user's insurance coverage is automatically adjusted, along with the premium, by the insurance provider. In one embodiment, to help the insured party/user stay within a budget, the insured party/user can set premium limits that are not to be exceeded without the insured party/user's express consent.

In one embodiment, the trigger purchase results in contact from the insurance provider and an offer to adjust coverage.

In one embodiment, once the insured party/user's insurance coverage is adjusted to include the value of the trigger purchase at ADJUST INSURANCE COVERAGE OPERATION 310, process for monitoring and dynamically adjusting insurance coverage 300 is exited at EXIT 311 and, in one embodiment, process flow returns to point 320 to await the next new purchase.

In one embodiment, the insured party/user is given the opportunity to decide whether or not to add a given purchase to the property covered by insurance, even if the purchase is a defined trigger purchase, i.e., the insured party/user is given an opportunity to opt the purchase out of the process before the information about the trigger purchase is sent to the insurance provider and the insurance coverage is manually, or automatically, adjusted.

Figure 4:
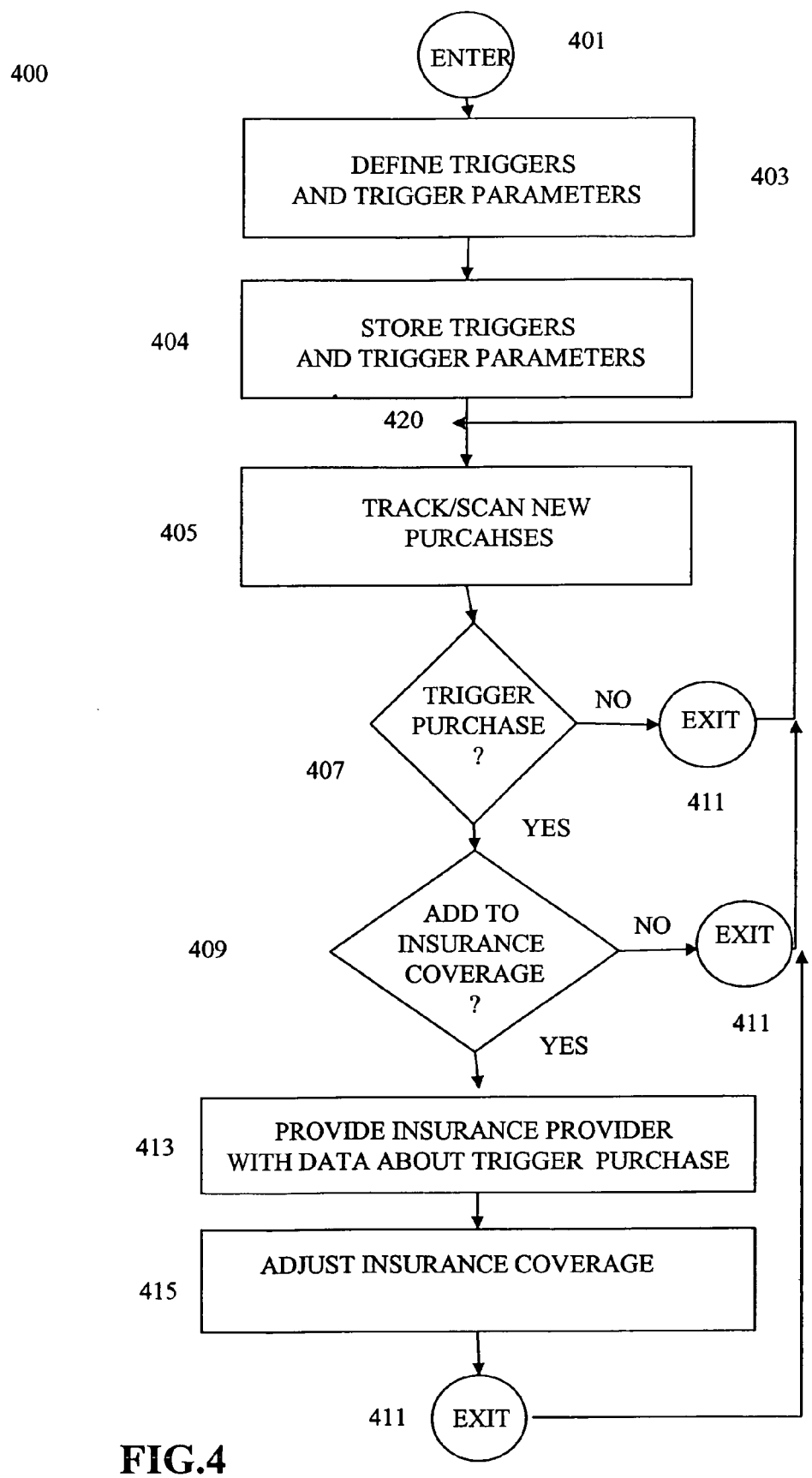
FIG. 4 is a flow diagram of a process for monitoring and dynamically adjusting insurance coverage in accordance with one embodiment.

Referring to FIGS. 4A and 4B together, a flow diagram of a process for monitoring and dynamically adjusting insurance coverage 400 in accordance with one embodiment is shown. Process for monitoring and dynamically adjusting insurance coverage 400 begins at enter operation 401. From enter operation 401, process flow moves to DEFINE TRIGGERS AND TRIGGER PARAMETERS OPERATION 403.

DEFINE TRIGGERS AND TRIGGER PARAMETERS OPERATION 403 of process for monitoring and dynamically adjusting insurance coverage 400 is substantially similar to DEFINE TRIGGERS AND TRIGGER PARAMETERS OPERATION 203 of process for monitoring and dynamically adjusting insurance coverage 200 discussed above, and the entire discussion above regarding DEFINE TRIGGERS AND TRIGGER PARAMETERS OPERATION 203 of process for monitoring and dynamically adjusting insurance coverage 200 applies to, and is incorporated here for, DEFINE TRIGGERS AND TRIGGER PARAMETERS OPERATION 403 of process for monitoring and dynamically adjusting insurance coverage 400. In particular, in one embodiment of process for monitoring and dynamically adjusting insurance coverage 400, trigger events and/or parameters may be: any purchase from a specific store/merchant, or type of store/merchant; any purchase in a specific location; a predetermined dollar amount spent at a given store or location; a predetermined dollar amount spent in a given time frame; or any other event or parameter as defined by the user. Once trigger events and/or trigger parameters are defined at DEFINE TRIGGERS AND TRIGGER PARAMETERS OPERATION 403, process flow moves to STORE TRIGGERS AND TRIGGER PARAMETERS OPERATION 404.

STORE TRIGGERS AND TRIGGER PARAMETERS OPERATION 404 of process for monitoring and dynamically adjusting insurance coverage 400 is substantially similar to STORE TRIGGERS AND TRIGGER PARAMETERS OPERATION 204 of process for monitoring and dynamically adjusting insurance coverage 200 discussed above, and the entire discussion above regarding STORE TRIGGERS AND TRIGGER PARAMETERS OPERATION 204 of process for monitoring and dynamically adjusting insurance coverage 200 applies to, and is incorporated here for, STORE TRIGGERS AND TRIGGER PARAMETERS OPERATION 404 of process for monitoring and dynamically adjusting insurance coverage 400. In particular, in one embodiment of process for monitoring and dynamically adjusting insurance coverage 400, at STORE TRIGGERS AND TRIGGER PARAMETERS OPERATION 404, the trigger events and parameters defined at DEFINE TRIGGERS AND TRIGGER PARAMETERS OPERATION 403 are stored in any one or more of numerous locations, by any one of the numerous mechanisms known to those of skill in the art and/or as described above with respect to STORE TRIGGERS AND TRIGGER PARAMETERS OPERATION 204 of process for monitoring and dynamically adjusting insurance coverage 200.

Once the trigger events and parameters defined at DEFINE TRIGGERS AND TRIGGER PARAMETERS OPERATION 403 are stored at STORE TRIGGERS AND TRIGGER PARAMETERS OPERATION 404, process flow moves to TRACK/SCAN NEW PURCHASES OPERATION 405.

TRACK/SCAN NEW PURCHASES OPERATION 405 of process for monitoring and dynamically adjusting insurance coverage 400 is substantially similar to TRACK/SCAN NEW PURCHASES OPERATION 205 of process for monitoring and dynamically adjusting insurance coverage 200 discussed above, and the entire discussion above regarding TRACK/SCAN NEW PURCHASES OPERATION 205 of process for monitoring and dynamically adjusting insurance coverage 200 applies to, and is incorporated here for, TRACK/SCAN NEW PURCHASES OPERATION 405 of process for monitoring and dynamically adjusting insurance coverage 400. In particular, in one embodiment of process for monitoring and dynamically adjusting insurance coverage 400, at TRACK/SCAN NEW PURCHASES OPERATION 405, data regarding a new purchase is entered into the computing device using process for monitoring and dynamically adjusting insurance coverage 400 via any of the means for obtaining/tracking data regarding a new purchase discussed above with respect to TRACK/SCAN NEW PURCHASES OPERATION 205 of process for monitoring and dynamically adjusting insurance coverage 200.

Once the data regarding a new purchase is obtained at TRACK/SCAN NEW PURCHASES OPERATION 405, process flow moves to TRIGGER PURCHASE? OPERATION 407. At TRIGGER PURCHASE? OPERATION 407 the data regarding the new purchase obtained at TRACK/SCAN NEW PURCHASES OPERATION 405 is compared with the trigger event and trigger parameters data defined at DEFINE TRIGGERS AND TRIGGER PARAMETERS OPERATION 403, and stored at STORE TRIGGERS AND TRIGGER PARAMETERS OPERATION 404, to determine if there is a match. In one embodiment, this comparison is accomplished via a look-up table or other register/storage based means for comparing data.

If none of the new purchase data obtained at TRACK/SCAN NEW PURCHASES OPERATION 405 matches any of the trigger event and trigger parameters data defined at DEFINE TRIGGERS AND TRIGGER PARAMETERS OPERATION 403, and stored at STORE TRIGGERS AND TRIGGER PARAMETERS OPERATION 403, i.e., a NO result is obtained at TRIGGER PURCHASE? OPERATION 407, then, in one embodiment, process for monitoring and dynamically adjusting insurance coverage 400 is exited at EXIT 411 and, in one embodiment, process flow returns to point 420 to await the next purchase.

On the other hand, if any of the new purchase data obtained at TRACK/SCAN NEW PURCHASES OPERATION 405 matches any of the trigger event and trigger parameters data defined at DEFINE TRIGGERS AND TRIGGER PARAMETERS OPERATION 403, and stored at STORE TRIGGERS AND TRIGGER PARAMETERS OPERATION 403, i.e., a YES result is obtained at TRIGGER PURCHASE? OPERATION 407, then, in one embodiment, the new purchase is identified as a "trigger purchase", i.e., as a purchase of personal and/or business property that may be eligible for and/or requires additional insurance coverage and process flow moves to ADD TO INSURANCE COVERAGE? OPERATION 409.

At ADD TO INSURANCE COVERAGE? OPERATION 409 the insured party/user is given an opportunity to exempt the new purchase from insurance coverage, despite the find that the new purchase is a defined as a trigger purchase at of TRIGGER PURCHASE? OPERATION 407. In one embodiment, the opportunity to exempt the new purchase is in the form of an inquiry at ADD TO INSURANCE COVERAGE? OPERATION 409.

In one embodiment, the inquiry generated at ADD TO INSURANCE COVERAGE? OPERATION 409 is in the form of inquiry screen on a display device such as display devices 115, 165, 125 of FIG. 1. FIG. 5 shows display screen 520 on display device 515, such as display devices 115 and 165 of FIG. 1, including an inquiry screen 560 asking the insured party/user if he/she wishes to add the new purchase of personal and/or business property to his/her insurance coverage.

In one embodiment, the inquiry generated at ADD TO INSURANCE COVERAGE? OPERATION 409 requires a positive action/acknowledgement such as clicking a check box 561 before process for monitoring and dynamically adjusting insurance coverage 400 is allowed to proceed.

In one embodiment, if the insured party/user chooses to exempt the new trigger purchase from insurance coverage, i.e., the insured party/user renders a NO response at ADD TO INSURANCE COVERAGE? OPERATION 409, process for monitoring and dynamically adjusting insurance coverage 400 is exited at EXIT 411 and, in one embodiment, flow proceeds to point 420 to await the next new purchase.

On the other hand, if the insured party/user chooses to not to exempt the new trigger purchase from insurance coverage, i.e., the insured party/user renders a YES response at ADD TO INSURANCE COVERAGE? OPERATION 409, process flow proceeds to PROVIDE INSURANCE PROVIDER WITH DATA ABOUT TRIGGER PURCHASE OPERATION 413.

PROVIDE INSURANCE PROVIDER WITH DATA ABOUT TRIGGER PURCHASE OPERATION 413 of process for monitoring and dynamically adjusting insurance coverage 400 is substantially similar to PROVIDE INSURANCE PROVIDER WITH DATA ABOUT TRIGGER PURCHASE OPERATION 309 of process for monitoring and dynamically adjusting insurance coverage 300 discussed above (FIG. 3), and the entire discussion above regarding PROVIDE INSURANCE PROVIDER WITH DATA ABOUT TRIGGER PURCHASE OPERATION 309 of process for monitoring and dynamically adjusting insurance coverage 300 applies to, and is incorporated here for, PROVIDE INSURANCE PROVIDER WITH DATA ABOUT TRIGGER PURCHASE OPERATION 413 (FIG. 4) of process for monitoring and dynamically adjusting insurance coverage 400. In particular, at PROVIDE INSURANCE PROVIDER WITH DATA ABOUT TRIGGER PURCHASE OPERATION 413, data regarding the trigger purchase from TRACK/SCAN NEW PURCHASES OPERATION 405, and any additional data added as described above, is made available to the insurance provider providing the insured party/user's coverage.

Once the data regarding the trigger purchase from TRACK/SCAN NEW PURCHASES OPERATION 405 is provided to the insurance provider at PROVIDE INSURANCE PROVIDER WITH DATA ABOUT TRIGGER PURCHASE OPERATION 413, process flow moves to ADJUST INSURANCE COVERAGE OPERATION 415. At ADJUST INSURANCE COVERAGE OPERATION 415, the insured party/user's insurance coverage is adjusted to include the value of the trigger purchase. In one embodiment, assuming an appropriate agreement is in place between the insured party/user and insurance provider, the insured party/user's insurance coverage is automatically adjusted, along with the premium, by the insurance provider. In one embodiment, the trigger purchase results in contact from the insurance provider and an offer to adjust coverage.

In one embodiment, once the insured party/user's insurance coverage is adjusted to include the value of the trigger purchase at ADJUST INSURANCE COVERAGE OPERATION 415, process for monitoring and dynamically adjusting insurance coverage 400 is exited at EXIT 411 and, in one embodiment, process flow returns to point 420 to await the next purchase.

As discussed above, many homeowner's/building insurance policies ask for an initial inventory of personal/business property kept in the insured structure, and provide a range, or cap, of personal/business property that is covered by the policy. For instance, a typical homeowner's policy will provide for replacement value of the home structure at a base premium plus, for additional premiums, various ranges of personal property value can also be covered such as zero to five thousand dollars, five to ten thousand dollars, ten to twenty thousand dollars and so on. In this way, the homeowner's/building insurance policies can be "customized" and made flexible enough to meet the needs of numerous different insured parties, and can evolve with the needs of any given insured party/user. However, as the value of personal/business property covered changes, it is typically left to customer, i.e., the insured party/user, to adjust the insurance coverage and/or premium to reflect this change. In one embodiment, these ranges of coverage can be accommodated by a process for monitoring and dynamically adjusting insurance coverage.

Figure 6A:
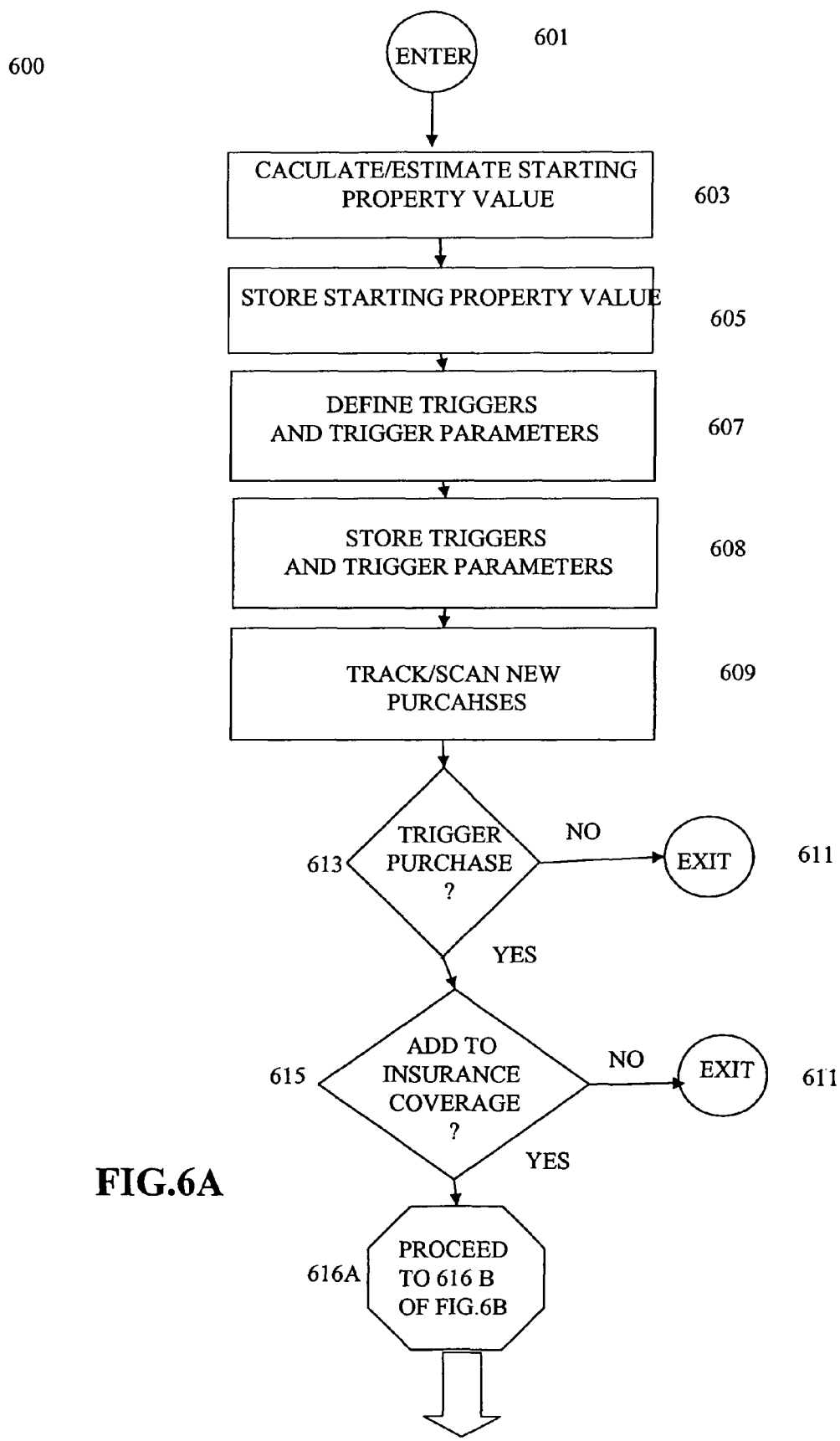
FIGS. 6A and 6B together are a flow diagram of a process for monitoring and dynamically adjusting insurance coverage in accordance with one embodiment.
Figure 6B:
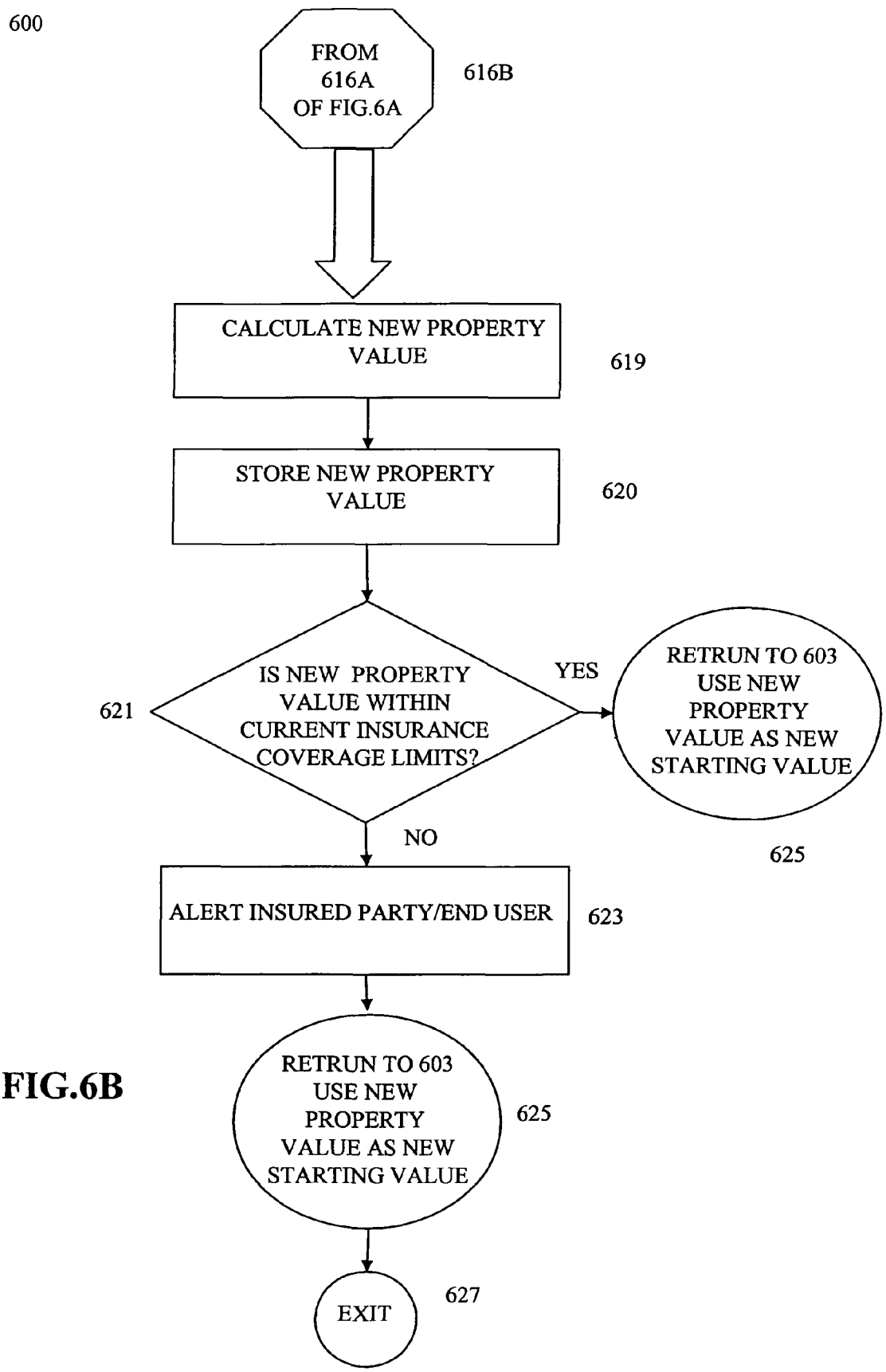

Referring to FIGS. 6A and 6B, a flow diagram of a process for monitoring and dynamically adjusting insurance coverage 600 in accordance with one embodiment is shown. Process for monitoring and dynamically adjusting insurance coverage 600 begins at enter operation 601. From enter operation 601, process flow moves CALCULATE/ESTIMATE STARTING PROPERTY VALUE OPERATION 603.

At CALCULATE/ESTIMATE STARTING PROPERTY VALUE OPERATION 603, a starting, i.e., previous to a new purchase at TRACK/SCAN NEW PURCHASES OPERATION 609, property value for all the personal and/or business property eligible and/or requiring insurance coverage is obtained. The starting property value can be obtained by estimate, from an inventory source previously created, from a history stored as part of a financial institutions records, such as a bank website or, form money management software program such as Quicken®, discussed above, a tax software program such as TurboTax® also discussed above, by bar code reader, RFID, or any other means, manual, semi-automatic or automatic, for obtaining/estimating an initial inventory and initial/starting property value.

Once the starting property value is obtained at CALCULATE/ESTIMATE STARTING PROPERTY VALUE OPERATION 603, process flow proceeds to STORE STARTING PROPERTY VALUE OPERATION 605. At STORE STARTING PROPERTY VALUE OPERATION 605 the data from CALCULATE/ESTIMATE STARTING PROPERTY VALUE OPERATION 603 is stored in any one or more of numerous locations, by any one of the numerous mechanisms known to those of skill in the art. For instance, in one embodiment, at STORE STARTING PROPERTY VALUE OPERATION 605 data from CALCULATE/ESTIMATE STARTING PROPERTY VALUE OPERATION 603 is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, at STORE STARTING PROPERTY VALUE OPERATION 605 data from CALCULATE/ESTIMATE STARTING PROPERTY VALUE OPERATION 603 is stored in any computing device and/or server system, such as computing devices 100, 151, or server system 120, or other device, maintained at another location, or on/in computer readable medium, and/or any other computer program product, as defined herein. In one embodiment, at STORE STARTING PROPERTY VALUE OPERATION 605 data from CALCULATE/ESTIMATE STARTING PROPERTY VALUE OPERATION 603 is stored on a webpage or in a web-based system.

Returning to FIG. 6, once data from CALCULATE/ESTIMATE STARTING PROPERTY VALUE OPERATION 603 is stored at STORE STARTING PROPERTY VALUE OPERATION 605, process flow proceeds to DEFINE TRIGGERS AND TRIGGER PARAMETERS OPERATION 607.

DEFINE TRIGGERS AND TRIGGER PARAMETERS OPERATION 607 of process for monitoring and dynamically adjusting insurance coverage 600 is substantially similar to DEFINE TRIGGERS AND TRIGGER PARAMETERS OPERATION 203 of process for monitoring and dynamically adjusting insurance coverage 200 discussed above, and the entire discussion above regarding DEFINE TRIGGERS AND TRIGGER PARAMETERS OPERATION 203 of process for monitoring and dynamically adjusting insurance coverage 200 applies to, and is incorporated here for, DEFINE TRIGGERS AND TRIGGER PARAMETERS OPERATION 607 of process for monitoring and dynamically adjusting insurance coverage 600. In particular, in one embodiment of process for monitoring and dynamically adjusting insurance coverage 600, trigger events and/or parameters may be: any purchase from a specific store/merchant, or type of store/merchant; any purchase in a specific location; a predetermined dollar amount spent at a given store or location; a predetermined dollar amount spent in a given time frame; or any other event or parameter as defined by the user. Once trigger events and/or trigger parameters are defined at DEFINE TRIGGERS AND TRIGGER PARAMETERS OPERATION 607, process flow moves to STORE TRIGGERS AND TRIGGER PARAMETERS OPERATION 608.

STORE TRIGGERS AND TRIGGER PARAMETERS OPERATION 608 of process for monitoring and dynamically adjusting insurance coverage 600 is substantially similar to STORE TRIGGERS AND TRIGGER PARAMETERS OPERATION 204 of process for monitoring and dynamically adjusting insurance coverage 200 discussed above, and the entire discussion above regarding STORE TRIGGERS AND TRIGGER PARAMETERS OPERATION 204 of process for monitoring and dynamically adjusting insurance coverage 200 applies to, and is incorporated here for, STORE TRIGGERS AND TRIGGER PARAMETERS OPERATION 608 of process for monitoring and dynamically adjusting insurance coverage 600. In particular, in one embodiment of process for monitoring and dynamically adjusting insurance coverage 600, at STORE TRIGGERS AND TRIGGER PARAMETERS OPERATION 608, the trigger events and parameters defined at DEFINE TRIGGERS AND TRIGGER PARAMETERS OPERATION 607 are stored in any one or more of numerous locations, by any one of the numerous mechanisms known to those of skill in the art and/or as described above with respect to STORE TRIGGERS AND TRIGGER PARAMETERS OPERATION 204 of process for monitoring and dynamically adjusting insurance coverage 200.

Once the trigger events and parameters defined at DEFINE TRIGGERS AND TRIGGER PARAMETERS OPERATION 607 are stored at STORE TRIGGERS AND TRIGGER PARAMETERS OPERATION 608, process flow moves to TRACK/SCAN NEW PURCHASES OPERATION 609.

TRACK/SCAN NEW PURCHASES OPERATION 609 of process for monitoring and dynamically adjusting insurance coverage 600 is substantially similar to TRACK/SCAN NEW PURCHASES OPERATION 205 of process for monitoring and dynamically adjusting insurance coverage 200 discussed above, and the entire discussion above regarding TRACK/SCAN NEW PURCHASES OPERATION 205 of process for monitoring and dynamically adjusting insurance coverage 200 applies to, and is incorporated here for, TRACK/SCAN NEW PURCHASES OPERATION 609 of process for monitoring and dynamically adjusting insurance coverage 600. In particular, in one embodiment of process for monitoring and dynamically adjusting insurance coverage 600, at TRACK/SCAN NEW PURCHASES OPERATION 609, data regarding a new purchase is entered into the computing device using process for monitoring and dynamically adjusting insurance coverage 600 via any of the means for obtaining/tracking data regarding a new purchase discussed above with respect to TRACK/SCAN NEW PURCHASES OPERATION 205 of process for monitoring and dynamically adjusting insurance coverage 200.

Once the data regarding a new purchase is obtained at TRACK/SCAN NEW PURCHASES OPERATION 609, process flow moves to TRIGGER PURCHASE? OPERATION 613. At TRIGGER PURCHASE? OPERATION 613 the data regarding the new purchase obtained at TRACK/SCAN NEW PURCHASES OPERATION 609 is compared with the trigger event and trigger parameters data defined at DEFINE TRIGGERS AND TRIGGER PARAMETERS OPERATION 607, and stored at STORE TRIGGERS AND TRIGGER PARAMETERS OPERATION 608, to determine if there is a match. In one embodiment, this comparison is accomplished via a look-up table or other register/storage based means for comparing data.

If none of the new purchase data obtained at TRACK/SCAN NEW PURCHASES OPERATION 609 matches any of the trigger event and trigger parameters data defined at DEFINE TRIGGERS AND TRIGGER PARAMETERS OPERATION 607, and stored at STORE TRIGGERS AND TRIGGER PARAMETERS OPERATION 603, i.e., a NO result is obtained at TRIGGER PURCHASE? OPERATION 613, then, in one embodiment, process for monitoring and dynamically adjusting insurance coverage 600 is exited at EXIT 611 and, in one embodiment, process flow returns to TRACK/SCAN NEW PURCHASES OPERATION 609 to await the next purchase.

On the other hand, if any of the new purchase data obtained at TRACK/SCAN NEW PURCHASES OPERATION 609 matches any of the trigger event and trigger parameters data defined at DEFINE TRIGGERS AND TRIGGER PARAMETERS OPERATION 607, and stored at STORE TRIGGERS AND TRIGGER PARAMETERS OPERATION 603, i.e., a YES result is obtained at TRIGGER PURCHASE? OPERATION 613, then, in one embodiment, the new purchase is identified as a "trigger purchase", i.e., as a purchase of personal and/or business property that may be eligible for and/or require additional insurance coverage and process flow moves to ADD TO INSURANCE COVERAGE? OPERATION 615.

ADD TO INSURANCE COVERAGE? OPERATION 615 of process for monitoring and dynamically adjusting insurance coverage 600 is substantially similar to ADD TO INSURANCE COVERAGE? OPERATION 409 of process for monitoring and dynamically adjusting insurance coverage 400 discussed above, and the entire discussion above regarding ADD TO INSURANCE COVERAGE? OPERATION 409 of process for monitoring and dynamically adjusting insurance coverage 400 applies to, and is incorporated here for, ADD TO INSURANCE COVERAGE? OPERATION 615 of process for monitoring and dynamically adjusting insurance coverage 600. In particular, at ADD TO INSURANCE COVERAGE? OPERATION 615, the insured party/user is given an opportunity to exempt the new purchase from insurance coverage, despite the fact that the new purchase is a defined as a trigger purchase at of TRIGGER PURCHASE? OPERATION 613.

In one embodiment, if the insured party/user chooses to exempt the new trigger purchase from insurance coverage, the insured party/user renders a NO response at ADD TO INSURANCE COVERAGE? OPERATION 615, and process for monitoring and dynamically adjusting insurance coverage 600 is exited at EXIT 611 and, in one embodiment, flow returns to TRACK/SCAN NEW PURCHASES OPERATION 609 to await the next purchase.

On the other hand, if the insured party/user chooses to not to exempt the new trigger purchase from insurance coverage, the insured party/user renders a YES response at ADD TO INSURANCE COVERAGE? OPERATION 615, and process flow proceeds to, and through, PROCEED TO 616B IN FIG. 6B PORT 616A, to, and through. FROM 616A OF FIG. 6A PORT 616B, and on to CALCULATE NEW PROPERTY VALUE OPERATION 619.

At CALCULATE NEW PROPERTY VALUE OPERATION 619, the value of the new purchase from TRACK/SCAN NEW PURCHASES OPERATION 609 is added to the starting property value from CALCULATE/ESTIMATE STARTING PROPERTY VALUE OPERATION 603 and stored at STORE STARTING PROPERTY VALUE OPERATION 605 to a calculate a new property value of property eligible for and/or requiring insurance coverage. Once the new property value of property eligible for and/or requiring insurance coverage is calculated at CALCULATE NEW PROPERTY VALUE OPERATION 619, process flow proceeds to STORE NEW PROPERTY VALUE OPERATION 620.

At STORE NEW PROPERTY VALUE OPERATION 620 the new property value data is stored in any one or more of numerous locations, by any one of the numerous mechanisms known to those of skill in the art. For instance, in one embodiment, at STORE NEW PROPERTY VALUE OPERATION 620 data from CALCULATE NEW PROPERTY VALUE OPERATION 619 is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, at STORE NEW PROPERTY VALUE OPERATION 620 data from CALCULATE NEW PROPERTY VALUE OPERATION 619 is stored in any computing device and/or server system, such as computing devices 100, 151, or server system 120, or other device, maintained at another location, or on/in computer readable medium, and/or any other computer program product, as defined herein. In one embodiment, at STORE NEW PROPERTY VALUE OPERATION 620 data from CALCULATE NEW PROPERTY VALUE OPERATION 619 is stored on a webpage or in a web-based system.

Once the new property value data from CALCULATE NEW PROPERTY VALUE OPERATION 619 is stored at STORE NEW PROPERTY VALUE OPERATION 620, process flow proceeds to IS NEW PROPERTY VALUE WITHIN CURRENT INSURANCE COVERAGE LIMITS? OPERATION 621. At IS NEW PROPERTY VALUE WITHIN CURRENT INSURANCE COVERAGE LIMITS? OPERATION 621, the new property value calculated at CALCULATE NEW PROPERTY VALUE OPERATION 619, and stored at STORE NEW PROPERTY VALUE OPERATION 620, is compared to the limit of coverage of the insured party/user's current homeowner's/business property insurance policy. In one embodiment this comparison is accomplished via a look-up table or other register/storage based means for comparing data.

If at IS NEW PROPERTY VALUE WITHIN CURRENT INSURANCE COVERAGE LIMITS? OPERATION 621 it is determined that the new property value calculated at CALCULATE NEW PROPERTY VALUE OPERATION 619 and stored at STORE NEW PROPERTY VALUE OPERATION 620 is still within the policy limits of insured party/user's current homeowner's/business property insurance policy, i.e., a YES determination is made, then process flow proceeds to RETURN TO 603, USE NEW PROPERTY VALUE AS STARTING VALUE OPERATION 625.

At RETURN TO 603, USE NEW PROPERTY VALUE AS STARTING VALUE OPERATION 625, process for monitoring and dynamically adjusting insurance coverage 600 transfers the new property value calculated at CALCULATE NEW PROPERTY VALUE OPERATION 619, and stored at STORE NEW PROPERTY VALUE OPERATION 620, to CALCULATE/ESTIMATE STARTING PROPERTY VALUE OPERATION 603 and the new property value calculated at CALCULATE NEW PROPERTY VALUE OPERATION 619, and stored at STORE NEW PROPERTY VALUE OPERATION 620, becomes the starting property value at CALCULATE/ESTIMATE STARTING PROPERTY VALUE OPERATION 603 for the next calculation/iteration of process for monitoring and dynamically adjusting insurance coverage 600. In one embodiment, process flow then returns to TRACK/SCAN NEW PURCHASES OPERATION 609 to await the next purchase.

If, on the other hand, at IS NEW PROPERTY VALUE WITHIN CURRENT INSURANCE COVERAGE LIMITS? OPERATION 621 it is determined that the new property value calculated at CALCULATE NEW PROPERTY VALUE OPERATION 619, and stored at STORE NEW PROPERTY VALUE OPERATION 620, is not within the policy limits of insured party/user's current homeowner's/business property insurance policy, i.e., a NO determination is made, then process flow proceeds to ALERT INSURED PARTY/USER OPERATION 623.

At ALERT INSURED PARTY/USER OPERATION 623, an alert is sent to the insured party/user informing him/her that the new property value calculated at CALCULATE NEW PROPERTY VALUE OPERATION 619, and stored at STORE NEW PROPERTY VALUE OPERATION 620, exceeds exiting policy limits and therefore, a potential gap now exists between the value of eligible property and the actual coverage available.

In one embodiment, the alert generated at ALERT INSURED PARTY/USER OPERATION 623 is in the form of a pop-up screen on a display device such as display devices 115, 165, 125 of FIG. 1 and as described above with respect to FIG. 2C and process for monitoring and dynamically adjusting insurance coverage 200.

In one embodiment, the alert generated at ALERT INSURED PARTY/USER OPERATION 623 is in the form of an E-mail or a computer telephony message or even an automatically generated phone call or letter. In one embodiment, the alert generated at ALERT INSURED PARTY/USER OPERATION 623 is sent to a portable computer, a workstation, a two-way pager, a cellular telephone, a smart phone, a digital wireless telephone, a personal digital assistant, a server computer, an Internet appliance, or any other device capable of displaying a video and/or audio alert to the insured party/user.

In one embodiment, the alert generated at ALERT INSURED PARTY/USER OPERATION 623 requires a positive action/acknowledgement, such as check box input, from the insured party/user before the alert is terminated.

Once the alert is generated at ALERT INSURED PARTY/USER OPERATION 623, process flow proceeds to RETURN TO 603, USE NEW PROPERTY VALUE AS STARTING VALUE OPERATION 625. As discussed above, in one embodiment, At RETURN TO 603, USE NEW PROPERTY VALUE AS STARTING VALUE OPERATION 625, process for monitoring and dynamically adjusting insurance coverage 600 transfers the new property value calculated at CALCULATE NEW PROPERTY VALUE OPERATION 619, and stored at STORE NEW PROPERTY VALUE OPERATION 620, to CALCULATE/ESTIMATE STARTING PROPERTY VALUE OPERATION 603 and the new property value calculated at CALCULATE NEW PROPERTY VALUE OPERATION 619, and stored at STORE NEW PROPERTY VALUE OPERATION 620, becomes the new starting property value for the next calculation/iteration of process for monitoring and dynamically adjusting insurance coverage 600. In one embodiment, process flow returns to EXIT 627 and then TRACK/SCAN NEW PURCHASES OPERATION 609 to await the next purchase.

Figure 7A:
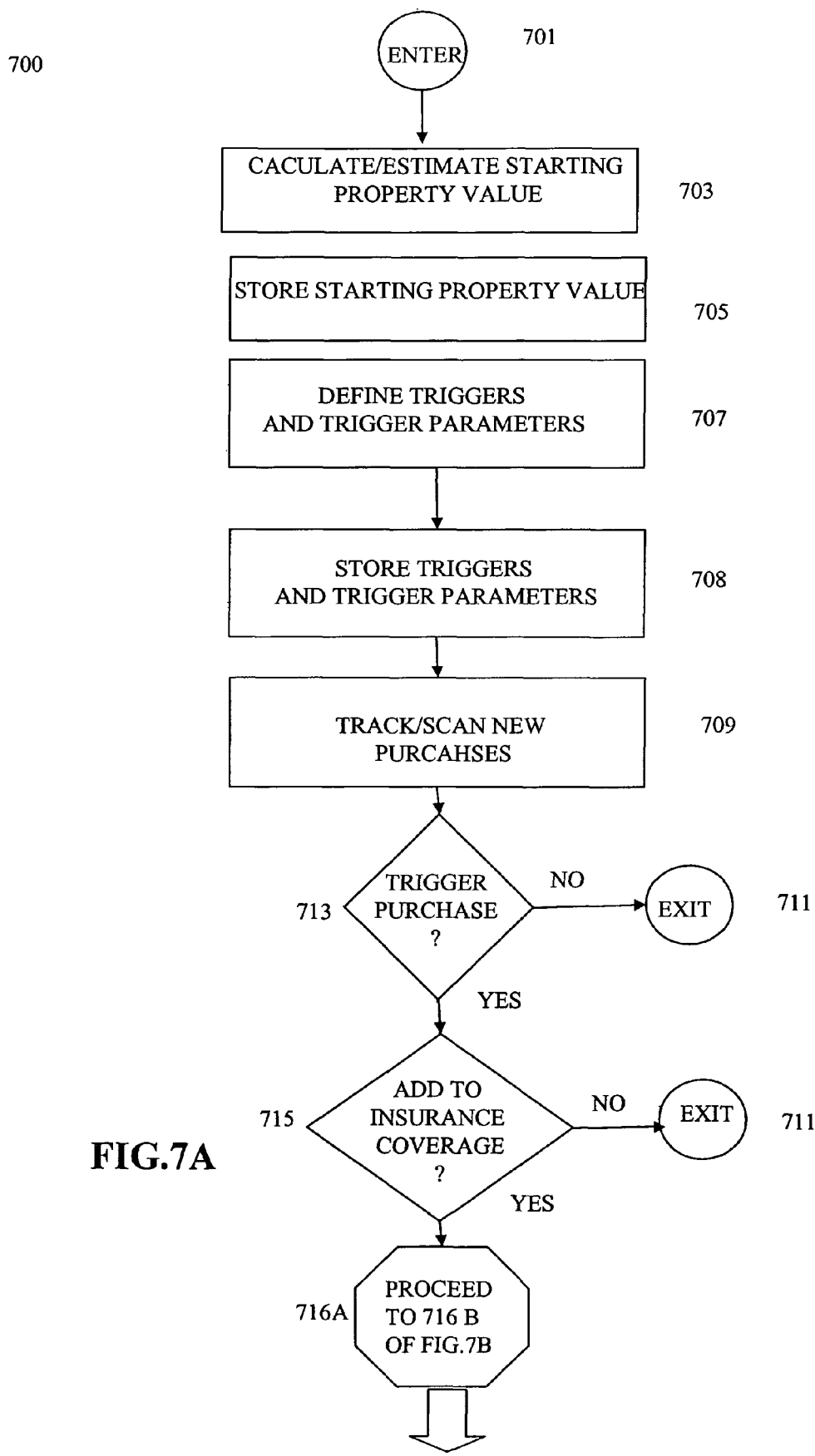
FIGS. 7A and 7B together are a flow diagram of a process for monitoring and dynamically adjusting insurance coverage in accordance with one embodiment; and Common reference numerals are used throughout the drawings and detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.
Figure 7B:
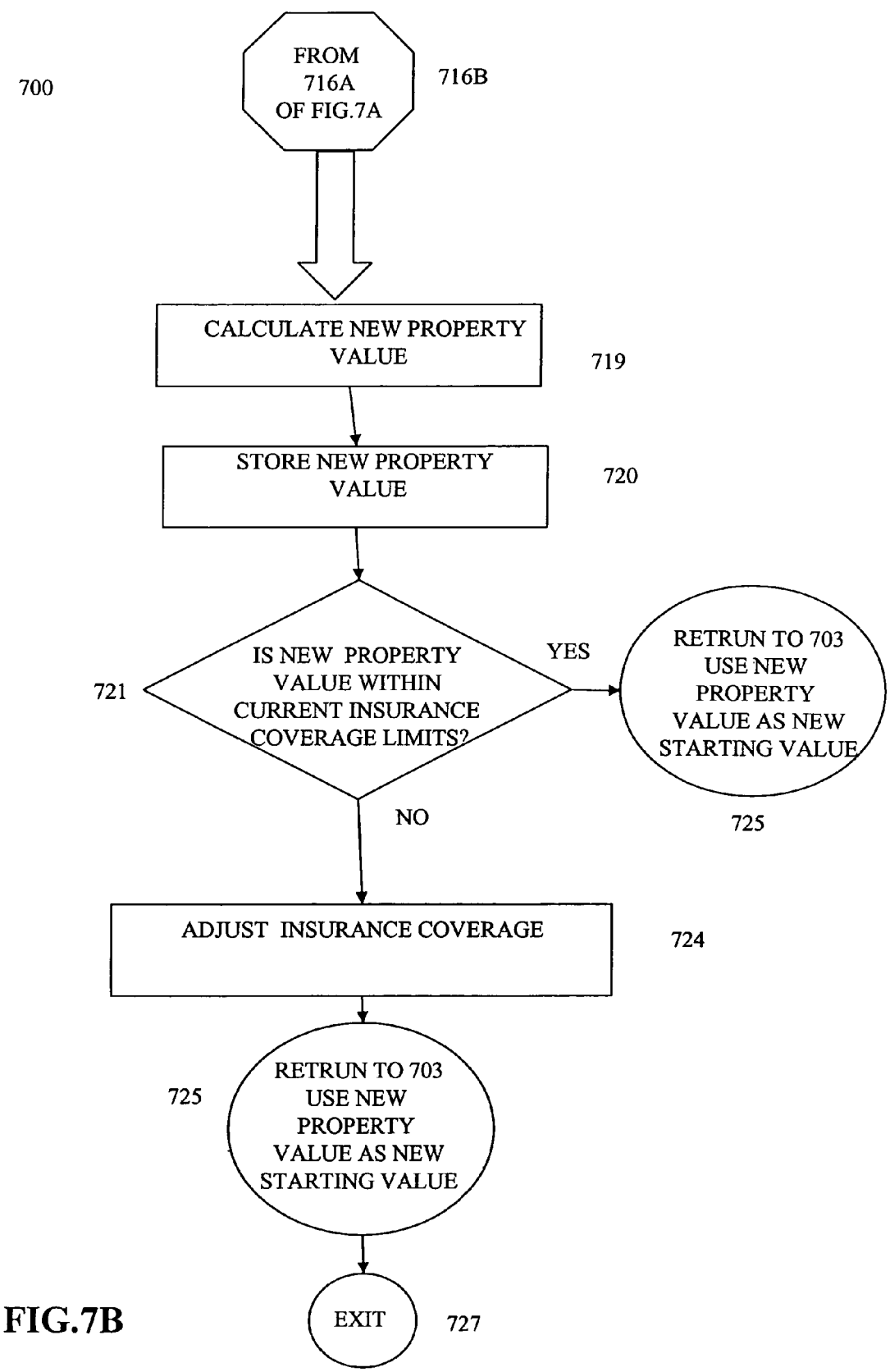

Referring to FIGS. 7A and 7B together, a flow diagram of a process for monitoring and dynamically adjusting insurance coverage 700 in accordance with one embodiment is shown. Process for monitoring and dynamically adjusting insurance coverage 700 begins at enter operation 701. From enter operation 701, process flow moves to CALCULATE/ESTIMATE STARTING PROPERTY VALUE OPERATION 703. CALCULATE/ESTIMATE STARTING PROPERTY VALUE OPERATION 703 of process for monitoring and dynamically adjusting insurance coverage 700 is substantially similar to CALCULATE/ESTIMATE STARTING PROPERTY VALUE OPERATION 603 of process for monitoring and dynamically adjusting insurance coverage 600 discussed above, and the entire discussion above regarding CALCULATE/ESTIMATE STARTING PROPERTY VALUE OPERATION 603 of process for monitoring and dynamically adjusting insurance coverage 600 applies to, and is incorporated here for, CALCULATE/ESTIMATE STARTING PROPERTY VALUE OPERATION 703 of process for monitoring and dynamically adjusting insurance coverage 700. In particular, at CALCULATE/ESTIMATE STARTING PROPERTY VALUE OPERATION 703, a starting, i.e., previous to a new purchase at TRACK/SCAN NEW PURCHASES OPERATION 709, property value for all the personal and/or business property eligible and/or requiring insurance coverage is obtained.

Once the starting property value is obtained at CALCULATE/ESTIMATE STARTING PROPERTY VALUE OPERATION 703, process flow proceeds to STORE STARTING PROPERTY VALUE OPERATION 705.

STORE STARTING PROPERTY VALUE OPERATION 705 of process for monitoring and dynamically adjusting insurance coverage 700 is substantially similar to STORE STARTING PROPERTY VALUE OPERATION 605 of process for monitoring and dynamically adjusting insurance coverage 600 discussed above, and the entire discussion above regarding STORE STARTING PROPERTY VALUE OPERATION 605 of process for monitoring and dynamically adjusting insurance coverage 600 applies to, and is incorporated here for, STORE STARTING PROPERTY VALUE OPERATION 705 of process for monitoring and dynamically adjusting insurance coverage 700. In particular, at STORE STARTING PROPERTY VALUE OPERATION 705 the data from CALCULATE/ESTIMATE STARTING PROPERTY VALUE OPERATION 703 is stored in any one or more of numerous locations, by any one of the numerous mechanisms known to those of skill in the art and/or discussed above.

Once data from CALCULATE/ESTIMATE STARTING PROPERTY VALUE OPERATION 703 is stored at STORE STARTING PROPERTY VALUE OPERATION 705, process flow proceeds to DEFINE TRIGGERS AND TRIGGER PARAMETERS OPERATION 707.

DEFINE TRIGGERS AND TRIGGER PARAMETERS OPERATION 707 of process for monitoring and dynamically adjusting insurance coverage 700 is substantially similar to DEFINE TRIGGERS AND TRIGGER PARAMETERS OPERATION 203 of process for monitoring and dynamically adjusting insurance coverage 200 discussed above, and the entire discussion above regarding DEFINE TRIGGERS AND TRIGGER PARAMETERS OPERATION 203 of process for monitoring and dynamically adjusting insurance coverage 200 applies to, and is incorporated here for, DEFINE TRIGGERS AND TRIGGER PARAMETERS OPERATION 707 of process for monitoring and dynamically adjusting insurance coverage 700. In particular, in one embodiment of process for monitoring and dynamically adjusting insurance coverage 700, trigger events and/or parameters may be: any purchase from a specific store/merchant, or type of store/merchant; any purchase in a specific location; a predetermined dollar amount spent at a given store or location; a predetermined dollar amount spent in a given time frame; or any other event or parameter as defined by the user. Once trigger events and/or trigger parameters are defined at DEFINE TRIGGERS AND TRIGGER PARAMETERS OPERATION 707, process flow moves to STORE TRIGGERS AND TRIGGER PARAMETERS OPERATION 708.

STORE TRIGGERS AND TRIGGER PARAMETERS OPERATION 708 of process for monitoring and dynamically adjusting insurance coverage 700 is substantially similar to STORE TRIGGERS AND TRIGGER PARAMETERS OPERATION 204 of process for monitoring and dynamically adjusting insurance coverage 200 discussed above, and the entire discussion above regarding STORE TRIGGERS AND TRIGGER PARAMETERS OPERATION 204 of process for monitoring and dynamically adjusting insurance coverage 200 applies to, and is incorporated here for, STORE TRIGGERS AND TRIGGER PARAMETERS OPERATION 708 of process for monitoring and dynamically adjusting insurance coverage 700. In particular, in one embodiment of process for monitoring and dynamically adjusting insurance coverage 700, at STORE TRIGGERS AND TRIGGER PARAMETERS OPERATION 708, the trigger events and parameters defined at DEFINE TRIGGERS AND TRIGGER PARAMETERS OPERATION 707 are stored in any one or more of numerous locations, by any one of the numerous mechanisms known to those of skill in the art and/or as described above with respect to STORE TRIGGERS AND TRIGGER PARAMETERS OPERATION 204 of process for monitoring and dynamically adjusting insurance coverage 200.

Once the trigger events and parameters defined at DEFINE TRIGGERS AND TRIGGER PARAMETERS OPERATION 707 are stored at STORE TRIGGERS AND TRIGGER PARAMETERS OPERATION 708, process flow moves to TRACK/SCAN NEW PURCHASES OPERATION 709.

TRACK/SCAN NEW PURCHASES OPERATION 709 of process for monitoring and dynamically adjusting insurance coverage 700 is substantially similar to TRACK/SCAN NEW PURCHASES OPERATION 205 of process for monitoring and dynamically adjusting insurance coverage 200 discussed above, and the entire discussion above regarding TRACK/SCAN NEW PURCHASES OPERATION 205 of process for monitoring and dynamically adjusting insurance coverage 200 applies to, and is incorporated here for, TRACK/SCAN NEW PURCHASES OPERATION 709 of process for monitoring and dynamically adjusting insurance coverage 700. In particular, in one embodiment of process for monitoring and dynamically adjusting insurance coverage 700, at TRACK/SCAN NEW PURCHASES OPERATION 709, data regarding a new purchase is entered into the computing device using process for monitoring and dynamically adjusting insurance coverage 700 via any of the means for obtaining/tracking data regarding a new purchase discussed above with respect to TRACK/SCAN NEW PURCHASES OPERATION 205 of process for monitoring and dynamically adjusting insurance coverage 200.

Once the data regarding a new purchase is obtained at TRACK/SCAN NEW PURCHASES OPERATION 709, process flow moves to TRIGGER PURCHASE? OPERATION 713. At TRIGGER PURCHASE? OPERATION 713 the data regarding the new purchase obtained at TRACK/SCAN NEW PURCHASES OPERATION 709 is compared with the trigger event and trigger parameters data defined at DEFINE TRIGGERS AND TRIGGER PARAMETERS OPERATION 707, and stored at STORE TRIGGERS AND TRIGGER PARAMETERS OPERATION 708, to determine if there is a match. In one embodiment, this comparison is accomplished via a look-up table or other register/storage based means for comparing data.

If none of the new purchase data obtained at TRACK/SCAN NEW PURCHASES OPERATION 709 matches any of the trigger event and trigger parameters data defined at DEFINE TRIGGERS AND TRIGGER PARAMETERS OPERATION 707, and stored at STORE TRIGGERS AND TRIGGER PARAMETERS OPERATION 703, i.e., a NO result is obtained at TRIGGER PURCHASE? OPERATION 713, then, in one embodiment, process for monitoring and dynamically adjusting insurance coverage 700 is exited at EXIT 711 and, in one embodiment, process flow returns to TRACK/SCAN NEW PURCHASES OPERATION 709 to await the next purchase.

On the other hand, if any of the new purchase data obtained at TRACK/SCAN NEW PURCHASES OPERATION 709 matches any of the trigger event and trigger parameters data defined at DEFINE TRIGGERS AND TRIGGER PARAMETERS OPERATION 707, and stored at STORE TRIGGERS AND TRIGGER PARAMETERS OPERATION 703, i.e., a YES result is obtained at TRIGGER PURCHASE? OPERATION 713, then, in one embodiment, the new purchase is identified as a "trigger purchase", i.e., as a purchase of personal and/or business property that may be eligible for and/or require additional insurance coverage and process flow moves to ADD TO INSURANCE COVERAGE? OPERATION 715.

ADD TO INSURANCE COVERAGE? OPERATION 715 of process for monitoring and dynamically adjusting insurance coverage 700 is substantially similar to ADD TO INSURANCE COVERAGE? OPERATION 409 of process for monitoring and dynamically adjusting insurance coverage 400 discussed above, and the entire discussion above regarding ADD TO INSURANCE COVERAGE? OPERATION 409 of process for monitoring and dynamically adjusting insurance coverage 400 applies to, and is incorporated here for, ADD TO INSURANCE COVERAGE? OPERATION 715 of process for monitoring and dynamically adjusting insurance coverage 700. In particular, at ADD TO INSURANCE COVERAGE? OPERATION 715 the insured party/user is given an opportunity to exempt the new purchase from insurance coverage, despite the fact that the new purchase is defined as a trigger purchase at TRIGGER PURCHASE? OPERATION 713.

In one embodiment, if the insured party/user chooses to exempt the new trigger purchase from insurance coverage, the insured party/user renders a NO response at ADD TO INSURANCE COVERAGE? OPERATION 715, and process for monitoring and dynamically adjusting insurance coverage 700 is exited at EXIT 711 and, in one embodiment, flow returns to TRACK/SCAN NEW PURCHASES OPERATION 709 to await the next purchase.

On the other hand, if the insured party/user chooses to not to exempt the new trigger purchase from insurance coverage, the insured party/user renders a YES response at ADD TO INSURANCE COVERAGE? OPERATION 715, and process flow proceeds to, and through, PROCEED TO 716B IN FIG. 7B PORT 716A, to, and through, FROM 716A OF FIG. 7A PORT 716B, and onto CALCULATE NEW PROPERTY VALUE OPERATION 719.

At CALCULATE NEW PROPERTY VALUE OPERATION 719, the value of the new purchase from TRACK/SCAN NEW PURCHASES OPERATION 709 is added to the starting value from CALCULATE/ESTIMATE STARTING PROPERTY VALUE OPERATION 703, and stored at STORE STARTING PROPERTY VALUE OPERATION 705, to a calculate a new property value of property eligible for and/or requiring insurance coverage. Once the new property value of property eligible for and/or requiring insurance coverage is calculated at CALCULATE NEW PROPERTY VALUE OPERATION 719, process flow proceeds to STORE NEW PROPERTY VALUE OPERATION 720.

STORE NEW PROPERTY VALUE OPERATION 720 of process for monitoring and dynamically adjusting insurance coverage 700 is substantially similar to STORE NEW PROPERTY VALUE OPERATION 620 of process for monitoring and dynamically adjusting insurance coverage 600 discussed above, and the entire discussion above regarding STORE NEW PROPERTY VALUE OPERATION 620 of process for monitoring and dynamically adjusting insurance coverage 600 applies to, and is incorporated here for, STORE NEW PROPERTY VALUE OPERATION 720 of process for monitoring and dynamically adjusting insurance coverage 700. In particular, at STORE NEW PROPERTY VALUE OPERATION 720 the new property value data is stored in any one or more of numerous locations, by any one of the numerous mechanisms known to those of skill in the art and/or discussed above.

Once the new property value data from CALCULATE NEW PROPERTY VALUE OPERATION 719 is stored at STORE NEW PROPERTY VALUE OPERATION 720, process flow proceeds to IS NEW PROPERTY VALUE WITHIN CURRENT INSURANCE COVERAGE LIMITS? OPERATION 721. At IS NEW PROPERTY VALUE WITHIN CURRENT INSURANCE COVERAGE LIMITS? OPERATION 721, the new property value calculated at CALCULATE NEW PROPERTY VALUE OPERATION 719, and stored at STORE NEW PROPERTY VALUE OPERATION 720, is compared to the limit of coverage of the insured party/user's current homeowner's/business property insurance policy. In one embodiment this comparison is accomplished via a look-up table or other register/storage based means for comparing data.

If at IS NEW PROPERTY VALUE WITHIN CURRENT INSURANCE COVERAGE LIMITS? OPERATION 721 it is determined that the new property value calculated at CALCULATE NEW PROPERTY VALUE OPERATION 719, and stored at STORE NEW PROPERTY VALUE OPERATION 720, is still within the policy limits of insured party/user's current homeowner's/business property insurance policy, i.e., a YES determination is made, then process flow proceeds to RETURN TO 703, USE NEW PROPERTY VALUE AS STARTING VALUE OPERATION 725.

At RETURN TO 703, USE NEW PROPERTY VALUE AS STARTING VALUE OPERATION 725, process for monitoring and dynamically adjusting insurance coverage 700 transfers the new property value calculated at CALCULATE NEW PROPERTY VALUE OPERATION 719, and stored at STORE NEW PROPERTY VALUE OPERATION 720, to CALCULATE/ESTIMATE STARTING PROPERTY VALUE OPERATION 703 and the new property value calculated at CALCULATE NEW PROPERTY VALUE OPERATION 719, and stored at STORE NEW PROPERTY VALUE OPERATION 720, becomes the starting property value at CALCULATE/ESTIMATE STARTING PROPERTY VALUE OPERATION 703 for the next calculation/iteration of process for monitoring and dynamically adjusting insurance coverage 700. In one embodiment, process flow then returns to TRACK/SCAN NEW PURCHASES OPERATION 709 to await the next purchase.

If, on the other hand, at IS NEW PROPERTY VALUE WITHIN CURRENT INSURANCE COVERAGE LIMITS? OPERATION 721 it is determined that the new property value calculated at CALCULATE NEW PROPERTY VALUE OPERATION 719, and stored at STORE NEW PROPERTY VALUE OPERATION 720, is not within the policy limits of insured party/user's current homeowner's/business property insurance policy, i.e., a NO determination is made, then process flow proceeds to ADJUST INSURANCE COVERAGE OPERATION 724.

At ADJUST INSURANCE COVERAGE OPERATION 724, the insured party/user's insurance coverage is adjusted to include the full value and/or replacement value and/or depreciated value of the trigger purchase either manually or automatically by mechanisms similar to those discussed above with respect to FIG. 3 and process 300.

In one embodiment, at ADJUST INSURANCE COVERAGE OPERATION 724 data regarding the new property value calculated at CALCULATE NEW PROPERTY VALUE OPERATION 719, and stored at STORE NEW PROPERTY VALUE OPERATION 720, is made available to the insurance provider providing the insured party/user's coverage.

In one embodiment, the new property value calculated at CALCULATE NEW PROPERTY VALUE OPERATION 719, and stored at STORE NEW PROPERTY VALUE OPERATION 720, is made available to the insurance provider at ADJUST INSURANCE COVERAGE OPERATION 724 via direct transmission of the information via network connection, E-mail, phone messaging, a connection to another computer via modems and analog lines, digital interfaces and a digital carrier line, or wireless or cellular connections to a portable computer, a workstation, a two-way pager, a cellular telephone, a smart phone, a digital wireless telephone, a personal digital assistant, a server computer, an Internet appliance, or any other device capable of displaying a video and/or audio alert.

In one embodiment, the new property value data calculated at CALCULATE NEW PROPERTY VALUE OPERATION 719, and stored at STORE NEW PROPERTY VALUE OPERATION 720, is made available to the insurance provider at ADJUST INSURANCE COVERAGE OPERATION 724 by placing the data in a memory, such as memory systems 103, 153 of FIG. 1, of a computing device, such as computing devices 100, 150 of FIG. 1, or in a server memory system, such as server memory system 123, of a local, or remotely, based sever system, such as server system 120 of FIG. 1, and then granting the insurance provider access to the computing device and/or server system.

In one embodiment, the new property value data calculated at CALCULATE NEW PROPERTY VALUE OPERATION 719, and stored at STORE NEW PROPERTY VALUE OPERATION 720, is made available to the insurance provider at ADJUST INSURANCE COVERAGE OPERATION 724 by placing the data in a database, such as database 170 of FIG. 1, and then granting the insurance provider access to the database.

In one embodiment, the new property value data calculated at CALCULATE NEW PROPERTY VALUE OPERATION 719 (FIG. 7), and stored at STORE NEW PROPERTY VALUE OPERATION 720, is made available to the insurance provider at ADJUST INSURANCE COVERAGE OPERATION 724 by placing the data on a webpage and/or in a web-based system and then granting the insurance provider access to the webpage and/or web-based system.

In one embodiment, the computing devices and/or the server system and/or data base and/or the web-based system discussed above, where the new property value data calculated at CALCULATE NEW PROPERTY VALUE OPERATION 719, and stored at STORE NEW PROPERTY VALUE OPERATION 720, resides, may be maintained by the insured party/user and/or the insurance provider and/or a third party, such as the provider of a process for monitoring and dynamically adjusting insurance coverage, such as processes for monitoring and dynamically adjusting insurance coverage 200, 300, 400, 600, and 700.

In one embodiment, the computing devices and/or the server system and/or data base and/or the web-based system discussed above, where the data regarding the new property value calculated at CALCULATE NEW PROPERTY VALUE OPERATION 719, and stored at STORE NEW PROPERTY VALUE OPERATION 720, resides can be made accessible by more than one insurance provider, at the insured party/user's request. In this embodiment, multiple insurance provides could access the data regarding the new property value calculated at CALCULATE NEW PROPERTY VALUE OPERATION 719, and stored at STORE NEW PROPERTY VALUE OPERATION 720, and provide competitive bids for coverage, thereby giving the insured party/user the opportunity to dynamically shop for insurance at home, and based on actual property data.

In one embodiment, data regarding the new property value calculated at CALCULATE NEW PROPERTY VALUE OPERATION 719, and stored at STORE NEW PROPERTY VALUE OPERATION 720, is made available to the insurance provider at ADJUST INSURANCE COVERAGE OPERATION 724, by placing the data in/on a computer readable medium and/or other computer program product, as defined herein, and then providing the computer medium or program product to the insurance provider.

In one embodiment, data regarding the new property value calculated at CALCULATE NEW PROPERTY VALUE OPERATION 719, and stored at STORE NEW PROPERTY VALUE OPERATION 720, is supplemented to include particular make and model numbers, serial numbers and other identifying data, by the insured party/user via a user interface device, such as keyboards 107, 157 and/or mice 111, 161, or by a bar code system, an RFID system, or some other automated, semi-automated or manual based system for obtaining product identification data. In this way the insurance provider is provided with the details necessary to calculate value, replacement cost, depreciation, appreciation and/or inflationary effects on the property making up the data regarding the new property value calculated at CALCULATE NEW PROPERTY VALUE OPERATION 719, and stored at STORE NEW PROPERTY VALUE OPERATION 720, and the insured party/user can store a more detailed inventory for any future claim. In one embodiment, images and/or photographs of particular property items can be included at ADJUST INSURANCE COVERAGE OPERATION 724.

In one embodiment, data regarding the new property value calculated at CALCULATE NEW PROPERTY VALUE OPERATION 719, and stored at STORE NEW PROPERTY VALUE OPERATION 720, is automatically backed up at regular intervals to a memory, such as memory systems 103, 153 of FIG. 1, of a computing device, such as computing devices 100, 150 of FIG. 1, or in a server memory system, such as server memory system 123, of a local, or remotely, based sever system, such as server system 120 of FIG. 1, or to a web-based system, for safekeeping of the data regarding the new property value calculated at CALCULATE NEW PROPERTY VALUE OPERATION 719 (FIG. 7), and stored at STORE NEW PROPERTY VALUE OPERATION 720, in a secure second location in case the original data is part of the personal/business property destroyed in a disaster.

In one embodiment, the data regarding the data regarding the new property value calculated at CALCULATE NEW PROPERTY VALUE OPERATION 719, and stored at STORE NEW PROPERTY VALUE OPERATION 720, is used to generate lists or reports for insurance claims and/or inventory or for tax/business purposes.

In one embodiment, assuming an appropriate agreement is in place between the insured party/user and insurance provider, the insured party/user's insurance coverage is automatically adjusted, along with the premium, by the insurance provider.

In one embodiment, to help the insured party/user stay within a budget, the insured party/user can set premium limits that are not to be exceeded without the as insured party/user's express consent.

In one embodiment, the new property value calculated at CALCULATE NEW PROPERTY VALUE OPERATION 719, and stored at STORE NEW PROPERTY VALUE OPERATION 720, results in contact from the insurance provider and an offer to adjust coverage.

In one embodiment, once the insured party/user's insurance coverage is adjusted to include the value of the trigger purchase at ADJUST INSURANCE COVERAGE OPERATION 724, process flow proceeds to RETURN TO 703, USE NEW PROPERTY VALUE AS STARTING VALUE OPERATION 725. As discussed above, in one embodiment, At RETURN TO 703, USE NEW PROPERTY VALUE AS STARTING VALUE OPERATION 725, process for monitoring and dynamically adjusting insurance coverage 700 transfers the new property value calculated at CALCULATE NEW PROPERTY VALUE OPERATION 719, and stored at STORE NEW PROPERTY VALUE OPERATION 720, to CALCULATE/ESTIMATE STARTING PROPERTY VALUE OPERATION 703 and the new property value calculated at CALCULATE NEW PROPERTY VALUE OPERATION 719, and stored at STORE NEW PROPERTY VALUE OPERATION 720, becomes the new starting property value for the next calculation/iteration of process for monitoring and dynamically adjusting insurance coverage 700. In one embodiment, process flow returns to EXIT 727 and then TRACK/SCAN NEW PURCHASES OPERATION 709 to await the next purchase.

In addition to adding personal/business property, there are occasions when personal/business property is disposed of and/or depreciated. This also changes the value of property eligible for and/or requiring insurance coverage. Those of skill in the art will readily recognize that, with minor adjustment/modification, a process for monitoring and dynamically adjusting insurance coverage, such as processes 200, 300, 400, 600, and 700 can be readily used to accommodate disposal/depreciation events, as well the acquisition events described above, depending on the needs of the insured party/user.

In accordance with one embodiment, an apparatus for monitoring and dynamically adjusting insurance coverage includes means for defining "trigger events" and/or "trigger parameters" such as a user interface device, such as keyboards 107, 157 in FIG. 1 and mice 111, 161 in FIG. 1. In one embodiment, the means for defining trigger events and parameters is manual data entry mechanisms or are mechanisms for obtaining data from another location such as a server system, such as server system 120 of FIG. 1, or from a database, such as database 170 of FIG. 1, or from a computer readable medium, and/or any computer program product, as defined herein, and then provided to the apparatus for monitoring and dynamically adjusting insurance coverage.

One embodiment of an apparatus for monitoring and dynamically adjusting insurance coverage includes means for storing the defined trigger events and trigger parameters such as a look-up table stored in any one or more of numerous locations, by any one of the numerous mechanisms known to those of skill in the art. For instance, in one embodiment, data about the trigger events and parameters defined is stored by means for storing the defined trigger events and trigger parameters such as a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, data about the trigger events and parameters defined is stored by means for storing the defined trigger events and trigger parameters in any computing device and/or server system, such as computing devices 100, 151, or server system 120, or other device, maintained at another location, or on/in computer readable medium, and/or any other computer program product, as defined herein. In one embodiment, data about the trigger events and parameters defined is stored by means for storing the defined trigger events and trigger parameters such as a webpage or a web-based system.

One embodiment of an apparatus for monitoring and dynamically adjusting insurance coverage includes means for tracking new purchases and entering data regarding a new purchase into an apparatus for monitoring and dynamically adjusting insurance coverage. In one embodiment, the means for tracking new purchases and data regarding new purchases is an interface with a money management software program such as Quicken®, a product of Intuit Inc. of Mountain View Calif., and similar products, and/or tax preparation software such as TurboTax®, a product of Intuit Inc. of Mountain View Calif., or similar products, which include a capability for tracking, gathering, storing, and categorizing data regarding purchases such as: purchase amounts; merchants/stores where the purchase was made; locations where the purchase was made; and the purchase dates. In addition, many money management software programs such as Quicken® often automatically categorize purchases by predefined parameters and/or customer defined parameters.

In one embodiment, the means for tracking new purchases and data regarding new purchases is manual entry by the insured party/user via a user interface device such as keyboards 107, 157 and mice 111, 161 of FIG. 1.

In one embodiment, the means for tracking new purchases and data regarding new purchases is a semi-automatic means using devices such as a barcode reader, an RFID device and reader, or any other semi-automated inventory system to identify a purchase of specific products or a purchase made from specific product category. Using these devices, data regarding new purchases can be scanned directly into a computing device, such as computing devices 100, 151 described above, and/or server system, such as server system 120 of FIG. 1, or other device, or to another location such as a centralized server or database, such as database 170 of FIG. 1, or onto or into a computer readable medium, and/or any computer program product, as defined herein.

In one embodiment, the means for tracking new purchases and data regarding new purchases is, or is aided by, a processor, such as processor 101, 151 or server system processor 121 of FIG. 1. In one embodiment, the means for tracking new purchases and data regarding new purchases is an Application Specific Integrated Circuit (ASIC), or any other hardware, firmware and/or software combination capable of performing simple calculations.

One embodiment of an apparatus for monitoring and dynamically adjusting insurance coverage includes means for determining if there is a match between any of the data collected by the means for tracking new purchases and data regarding new purchases and the trigger events and trigger parameters defined by the means for defining trigger events and/or trigger parameters stored by the means for storing the defined trigger events and trigger parameters.

In one embodiment, the means for determining if there is a match between any of the data collected by the means for tracking new purchases and data regarding new purchases and the trigger events and trigger parameters defined by the means for defining trigger events and/or trigger parameters includes a look-up table or other register/storage based means for comparing data.

In one embodiment, the means for determining if there is a match between any of the data collected by the means for tracking new purchases and data regarding new purchases and the trigger events and trigger parameters defined by the means for defining trigger events and/or trigger parameters is, or is aided by, a processor, such as processor 101, 151 or server system processor 121 of FIG. 1. In other embodiments, the means for determining if there is a match between any of the data collected by the means for tracking new purchases and data regarding new purchases and the trigger events and trigger parameters defined by the means for defining trigger events and/or trigger parameters is an Application Specific Integrated Circuit (ASIC), or any other hardware, firmware and/or software combination capable of performing simple calculations.

One embodiment of an apparatus for monitoring and dynamically adjusting insurance coverage includes means for alerting an insured party/user that a new purchase of personal and/or business property may be eligible for and/or require additional insurance coverage. In one embodiment, the means for alerting an insured party/user that a new purchase of personal and/or business property may be eligible for and/or require additional insurance coverage is a pop-up screen or other alert screen displayed on a display device such as display devices 115, 165, 125 of FIG. 1.

In one embodiment, the means for alerting an insured party/user that a new purchase of personal and/or business property may be eligible for and/or require additional insurance coverage is an E-mail or a computer telephony message or an automatically generated phone call or letter. In one embodiment, the alert generated by the means for alerting an insured party/user that a new purchase of personal and/or business property may be eligible for and/or require additional insurance coverage is sent to a portable computer, a workstation, a two-way pager, a cellular telephone, a smart phone, a digital wireless telephone, a personal digital assistant, a server computer, an Internet appliance, or any other device capable of displaying a video and/or audio alert to the insured party/user.

One embodiment of an apparatus for monitoring and dynamically adjusting insurance coverage includes means for providing an insurance provider data regarding a trigger purchase from the means for tracking new purchases and data regarding new purchases. In one embodiment, the means for providing an insurance provider data regarding a trigger purchase is a direct transmission of the information via network connection, E-mail, phone messaging, a connection to another computer via modems and analog lines, digital interfaces and a digital carrier line, or wireless or cellular connections to a portable computer, a workstation, a two-way pager, a cellular telephone, a smart phone, a digital wireless telephone, a personal digital assistant, a server computer, an Internet appliance, or any other device capable of displaying a video and/or audio message/alert.

In one embodiment, the means for providing an insurance provider data regarding a trigger purchase includes placing the information in a memory, such as memory systems 103, 153 of FIG. 1, of a computing device, such as computing devices 100, 150 of FIG. 1, or in a server memory system, such as server memory system 123, of a local, or remotely, based sever system, such as server system 120 of FIG. 1, and then granting the insurance provider access to the computing device and/or server system.

In one embodiment, the means for providing an insurance provider data regarding a trigger purchase includes placing the information in a database, such as database 170 of FIG. 1, and then granting the insurance provider access to the database.

In one embodiment, the means for providing an insurance provider data regarding a trigger purchase includes placing the information on a webpage and/or in a web-based system and then granting the insurance provider access to the webpage and/or web-based system.

In one embodiment, the means for providing an insurance provider data regarding a trigger purchase and the computing devices and/or the server system and/or data base and/or the web-based system discussed above, where the data regarding the trigger purchase resides, may be maintained by the insured party/user and/or the insurance provider and/or a third party, such as the provider of the apparatus for monitoring and dynamically adjusting insurance coverage.

In one embodiment, the means for providing an insurance provider data regarding a trigger purchase includes placing the information in/on a computer readable medium and/or other computer program product, as defined herein, and then providing the computer medium or program product to the insurance provider.

In one embodiment, the data collected by the means for tracking new purchases and data regarding new purchases is supplemented by the means for providing an insurance provider data regarding a trigger purchase to include make and model numbers, serial numbers and other identifying data, by the insured party/user via a user interface device, such as keyboards 107, 157 and/or mice 111, 161, or by a bar code system, an RFID system, or other automated, semi-automated or manual based system for obtaining product identification data.

One embodiment of an apparatus for monitoring and dynamically adjusting insurance coverage includes means for adjusting the insured party/user's insurance coverage to include the full value and/or replacement value and/or depreciated value of the trigger purchase. In one embodiment, assuming an appropriate agreement is in place between the insured party/user and insurance provider, the insured party/user's insurance coverage is automatically adjusted, along with the premium, by the insurance provider and the means for adjusting the insured party/user's insurance coverage. In one embodiment, the means for adjusting the insured party/user's insurance coverage is contact from the insurance provider and an offer to adjust coverage.

The method and apparatus for monitoring and dynamically adjusting insurance coverage described herein provides a mechanism whereby an insured party/user is alerted of the potential need to acquire additional insurance coverage at, or near, the time of purchase of the items needing such coverage. Consequently, using the method and apparatus for monitoring and dynamically adjusting personal/business property insurance coverage described herein, the insured party/user is at least alerted to any gaps developing between the value of personal and/or business property and the insurance coverage protecting the personal and/or business property. Therefore, the insured party/user has the opportunity to make a conscious, and educated, decision as to whether or not to obtain additional insurance coverage.

In addition, in one embodiment, the insurance coverage is automatically updated to provide the additional insurance coverage necessary to protect new purchases and therefore automatically minimize and/or eliminate any gaps between the value of personal and/or business property and the insurance coverage protecting the personal and/or business property.

In addition, as discussed above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and or functionality of the invention may be implemented via various combinations of software and hardware, as described, or entirely in hardware elements. Also, particular divisions of functionality between the various components described herein is exemplary, and not mandatory or significant. Consequently, functions performed by a single component may, in other embodiments, be performed by multiple components, and functions performed by multiple components may, in other embodiments, be performed by a single component.

Some portions of the above description may present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing devices. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "determining" or "displaying" or "scanning", "comparing", refer to the action and processes of a computing device or similar electronic device that manipulates and operates on data represented as physical (electronic) quantities within the computing device memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus for performing the operations described herein. This apparatus may be specifically constructed for the required purposes, or the apparatus can comprise a general purpose system selectively activated or configured/re-configured by a computer program stored on a computer program product, as defined herein, that can be accessed by a computing device or other device.

As discussed above, herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network or other media or methods capable of delivering computer readable data representing computer readable code. This medium may belong to a computing device. However, the medium also may be removed from the computing device.

Those of skill in the art will readily recognize that the algorithms and/or operations presented herein are not inherently related to any particular computing device, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a network, such as a LAN, WAN, or the Internet, or other network capable of allowing communication between two or more computing devices.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

Those of skill in the art will readily recognize that the particular operations, and the order of performing those operations, shown above for a process for monitoring and dynamically adjusting insurance coverage, such processes 200, 300, 400, 600, and 700, were chosen for illustrative purposes only and that a process for monitoring and dynamically adjusting insurance coverage, such processes 200, 300, 400, 600, and 700, described above, can be implemented with a lesser number or greater number of operations in a given embodiment, and that those operations can be performed in any logical order desired, based on the needs of the user.

In addition, the operations shown in the FIG.s for a process for monitoring and dynamically adjusting insurance coverage, such processes 200, 300, 400, 600, and 700, discussed above, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for monitoring and dynamically adjusting insurance coverage comprising:
a processor for executing at least part of a process for monitoring and dynamically adjusting insurance coverage, the process for monitoring and dynamically adjusting insurance coverage comprising:
defining one or more trigger events that identify purchased items as being potentially eligible for insurance coverage, wherein the one or more trigger events that identify purchased items as being potentially eligible for insurance coverage comprises two or more purchases of one or more items in a predefined time frame, the combined cost of the two or more purchases of one or more items totaling more than a predefined amount of money, the system being operable to consider as a possible trigger event each of whether a purchase of an item is from a predefined merchant, whether a purchase of an item is from a predefined merchant location and whether a purchase of an item costs more than a predefined amount of money;
storing data representing the one or more trigger events;
tracking a purchase of an item and collecting data associated with the purchase of the item;
comparing the collected data associated with the purchase of the item with the stored data representing the one or more trigger events, and
if there is a match between at least part of the collected data associated with the purchase of the item and at least part of the stored data representing the one or more trigger events, alerting a concerned party to the potential need to secure insurance coverage for the purchased item.

2. The system for monitoring and dynamically adjusting insurance coverage of claim 1, wherein:
the concerned party is an insured party.

3. The system for monitoring and dynamically adjusting insurance coverage of claim 1, wherein:
the concerned party is an insurance provider.

4. A system for monitoring and dynamically adjusting insurance coverage comprising:
a processor for executing at least part of a process for monitoring and dynamically adjusting insurance coverage, the process for monitoring and dynamically adjusting insurance coverage comprising:
defining one or more trigger events that identify purchased items as being potentially eligible for insurance coverage, wherein the one or more trigger events that identify purchased items as being potentially eligible for insurance coverage comprises two or more purchases of one or more items in a predefined time frame, the combined cost of the two or more purchases of one or more items totaling more than a predefined amount of money, the system being operable to consider as a possible trigger event each of whether a purchase of an item is from a predefined merchant, whether a purchase of an item is from a predefined merchant location and whether a purchase of an item costs more than a predefined amount of money;
storing data representing the one or more trigger events;
tracking a purchase of an item and collecting data associated with the purchase of the item;

comparing the collected data associated with the purchase of the item with the stored data representing the one or more trigger events; and if there is a match between at least part of the collected data associated with the purchase of the item and at least part of the stored data representing the one or more trigger events, transferring at least part of the collected data associated with the purchased item to an insurance provider.

5. The system for monitoring and dynamically adjusting insurance coverage of claim 4, wherein:

transferring at least part of the collected data associated with the purchase of the item to an insurance provider comprises transferring at least part of the collected data associated with the purchase of the item via transmission over a network connection.

6. The system for monitoring and dynamically adjusting insurance coverage of claim 4, wherein:

transferring at least part of the collected data associated with the purchase of the item to an insurance provider comprises placing the collected data associated with the purchase of the item in a memory of a computing device and then granting the insurance provider access to the computing device.

7. The system for monitoring and dynamically adjusting insurance coverage of claim 4, wherein:

transferring at least part of the collected data associated with the purchase of the item to an insurance provider comprises placing the collected data associated with the purchase of the item in a database and then granting the insurance provider access to the database.

8. The system for monitoring and dynamically adjusting insurance coverage of claim 4, wherein:

transferring at least part of the collected data associated with the purchase of the item to an insurance provider comprises placing the collected data associated with the purchase of the item in a webpage and then granting the insurance provider access to the webpage.

9. The system for monitoring and dynamically adjusting insurance coverage of claim 4, wherein:

transferring at least part of the collected data associated with the purchase of the item to an insurance provider comprises placing the collected data associated with the purchase of the item in a computer program product and then giving the insurance provider access to the computer program product.

10. The system for monitoring and dynamically adjusting insurance coverage of claim 4, further comprising:

alerting an insured party if there is a match between at least part of the collected data associated with the purchase of the item and at least part of the stored data representing the one or more trigger events.

11. The system for monitoring and dynamically adjusting insurance coverage of claim 4, further comprising:

automatically adjusting an insurance policy for an insured party to add the value of the purchased item to the insurance coverage of the insurance policy if there is a match between at least part of the collected data associated with the purchase of the item and at least part of the stored data representing the one or more trigger events.

12. A computer program product for monitoring and dynamically adjusting insurance coverage comprising:

a nontransitory computer readable medium;

and computer program code, encoded on the computer readable medium, comprising computer readable instructions which when executed by a processor perform a process comprising:

defining one or more trigger events that identify purchased items as being potentially eligible for insurance coverage, wherein the one or more trigger events that identify purchased items as being potentially eligible for insurance coverage comprises two or more purchases of one or more items in a predefined time frame, the combined cost of the two or more purchases of one or more items totaling more than a predefined amount of money, the process being operable to consider as a possible trigger event each of whether a purchase of an item is from a predefined merchant, whether a purchase of an item is from a predefined merchant location and whether a purchase of an item costs more than a predefined amount of money;

storing data representing the one or more trigger events;

tracking a purchase of an item and collecting data associated with the purchase of the item;

comparing the collected data associated with the purchase of the item with the stored data representing the one or more trigger events, and if there is a match between at least part of the collected data associated with the purchase of the item and at least part of the stored data representing the one or more trigger events, alerting a concerned party to the potential need to secure insurance coverage for the purchased item.

13. The computer program product for monitoring and dynamically adjusting insurance coverage of claim 12, wherein:

the concerned party is an insured party.

14. The computer program product for monitoring and dynamically adjusting insurance coverage of claim 12, wherein:

the concerned party is an insurance provider.

15. A computer program product for monitoring and dynamically adjusting insurance coverage comprising:

a nontransitory computer readable medium;

and computer program code, encoded on the computer readable medium, comprising computer readable instructions which when executed by a processor perform a process comprising:

defining one or more trigger events that identify purchased items as being potentially eligible for insurance coverage, wherein the one or more trigger events that identify purchased items as being potentially eligible for insurance coverage comprises two or more purchases of one or more items in a predefined time frame, the combined cost of the two or more purchases of one or more items totaling more than a predefined amount of money, the process being operable to consider as a possible trigger event each of whether a purchase of an item is from a predefined merchant, whether a purchase of an item is from a predefined merchant location and whether a purchase of an item costs more than a predefined amount of money;

storing data representing the one or more trigger events;

tracking a purchase of an item and collecting data associated with the purchase of the item;

comparing the collected data associated with the purchase of the item with the stored data representing the one or more trigger events; and if there is a match between at least part of the collected data associated with the purchase of the item and at least part of the stored data representing the one or more trigger events, transferring at least part of the collected data associated with the purchase of the item to an insurance provider.

16. The computer program product for monitoring and dynamically adjusting insurance coverage of claim 15, further comprising:

computer program code, encoded on the tangible computer readable medium, comprising computer readable instructions for:

automatically adjusting an insurance policy for an insured party to add the value of the purchased item to the insurance coverage of the insurance policy if there is a match between at least part of the collected data associated with the purchase of the item and at least part of the stored data representing the one or more trigger events.

\* \* \* \* \*